United States Patent
Link et al.

(10) Patent No.: US 10,532,506 B2
(45) Date of Patent: Jan. 14, 2020

(54) COMPACT CLAMP APPARATUS WITH INTEGRATED MOLD BREAK

(71) Applicant: Niigon Machines Ltd., Vaughan (CA)

(72) Inventors: Carsten Link, Burlington (CA); Robert D. Schad, Toronto (CA); Luke Osmokrovic, Toronto (CA)

(73) Assignee: NIIGON MACHINES LTD., Vaughan (CA)

( * ) Notice: Subject to any disclaimer, the term of this patent is extended or adjusted under 35 U.S.C. 154(b) by 419 days.

(21) Appl. No.: 15/599,840

(22) Filed: May 19, 2017

(65) Prior Publication Data

US 2017/0252955 A1 Sep. 7, 2017

Related U.S. Application Data

(63) Continuation of application No. PCT/CA2015/051208, filed on Nov. 19, 2015.

(60) Provisional application No. 62/082,123, filed on Nov. 19, 2014, provisional application No. 62/185,127, filed on Jun. 26, 2015.

(51) Int. Cl.
*B29C 45/67* (2006.01)
*B29C 45/17* (2006.01)
*B29C 45/12* (2006.01)
*B29C 45/64* (2006.01)

(52) U.S. Cl.
CPC ...... *B29C 45/6728* (2013.01); *B29C 45/1761* (2013.01); *B29C 45/12* (2013.01); *B29C 45/17* (2013.01); *B29C 45/64* (2013.01); *B29C 45/67* (2013.01); *B29C 45/6707* (2013.01); *B29C 45/6714* (2013.01); *B29C 2045/1792* (2013.01); *B29C 2045/6735* (2013.01); *B29C 2945/76568* (2013.01)

(58) Field of Classification Search
CPC ........................ B29C 45/1747; B29C 45/6728
See application file for complete search history.

(56) References Cited

U.S. PATENT DOCUMENTS

| 4,874,309 A | 10/1989 | Kushibe et al. |
| 5,302,108 A | 4/1994 | Wohlrab |
| (Continued) | | |

FOREIGN PATENT DOCUMENTS

| CA | 2607386 | 4/2009 |
| CN | 101600557 | 12/2009 |
| (Continued) | | |

*Primary Examiner* — James P Mackey
(74) *Attorney, Agent, or Firm* — Bereskin & Parr LLP/S.E.N.C.R.L., S.R.L.

(57) ABSTRACT

A clamp assembly for an injection molding machine includes (a) a clamp cylinder housing and (b) a clamp piston affixed to an end portion of a tie bar and slidable within the housing among a clamping position, a mold break position, and a meshing position disposed axially intermediate the clamping and the mold break positions. The clamp assembly further includes (c) a clamp chamber for urging the clamp piston towards the clamping position when pressurized; (d) a return device for urging the clamp piston towards the meshing position when pressure in the clamp chamber is relieved; and (e) a mold break chamber for urging the clamp piston towards the mold break position when pressurized. The mold break chamber is bounded axially by opposed surfaces of the tie bar and the return device.

32 Claims, 28 Drawing Sheets

(56) References Cited

U.S. PATENT DOCUMENTS

| | | | |
|---|---|---|---|
| 5,320,517 | A | 6/1994 | Hirata et al. |
| 5,345,766 | A | 9/1994 | Leonhartsberger et al. |
| 7,311,517 | B2 | 12/2007 | Manabe et al. |
| 7,497,678 | B2 | 3/2009 | Glaesener et al. |
| 7,611,346 | B2 | 11/2009 | Schad et al. |
| 7,981,334 | B2 | 7/2011 | Chiang |
| 8,221,670 | B2 | 7/2012 | Schad et al. |
| 9,333,691 | B2 * | 5/2016 | Schad .................. B29C 45/6728 |
| 2008/0187771 | A1 | 8/2008 | Schad et al. |
| 2013/0061741 | A1 * | 3/2013 | Link .................. F15B 15/1447 91/422 |

FOREIGN PATENT DOCUMENTS

| | | |
|---|---|---|
| EP | 2444676 | 4/2012 |
| JP | 2005335075 | 12/2005 |
| JP | 2008072113 | 3/2008 |
| WO | 2004024417 | 3/2004 |
| WO | 2008095282 | 8/2008 |
| WO | 2014183201 | 11/2014 |

\* cited by examiner

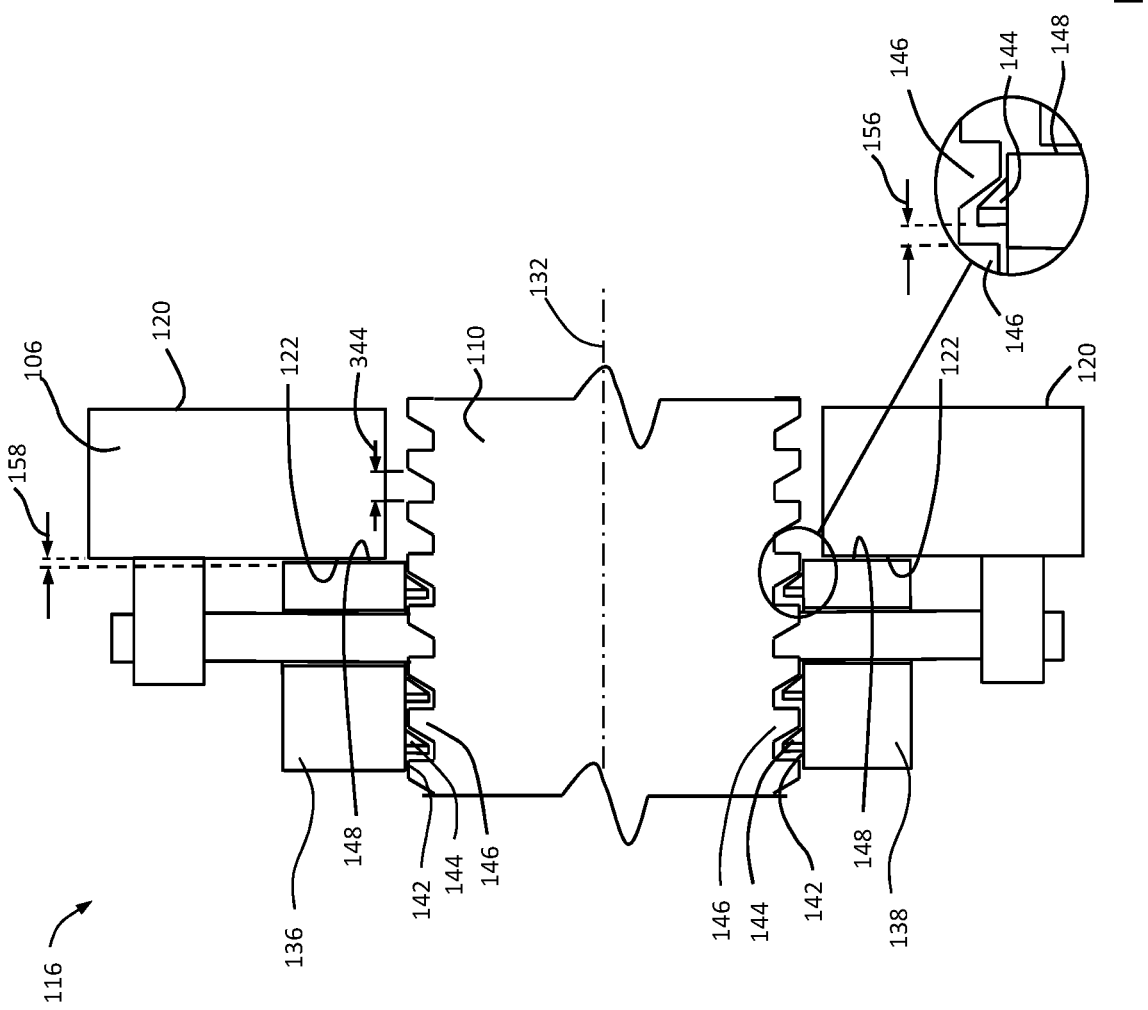

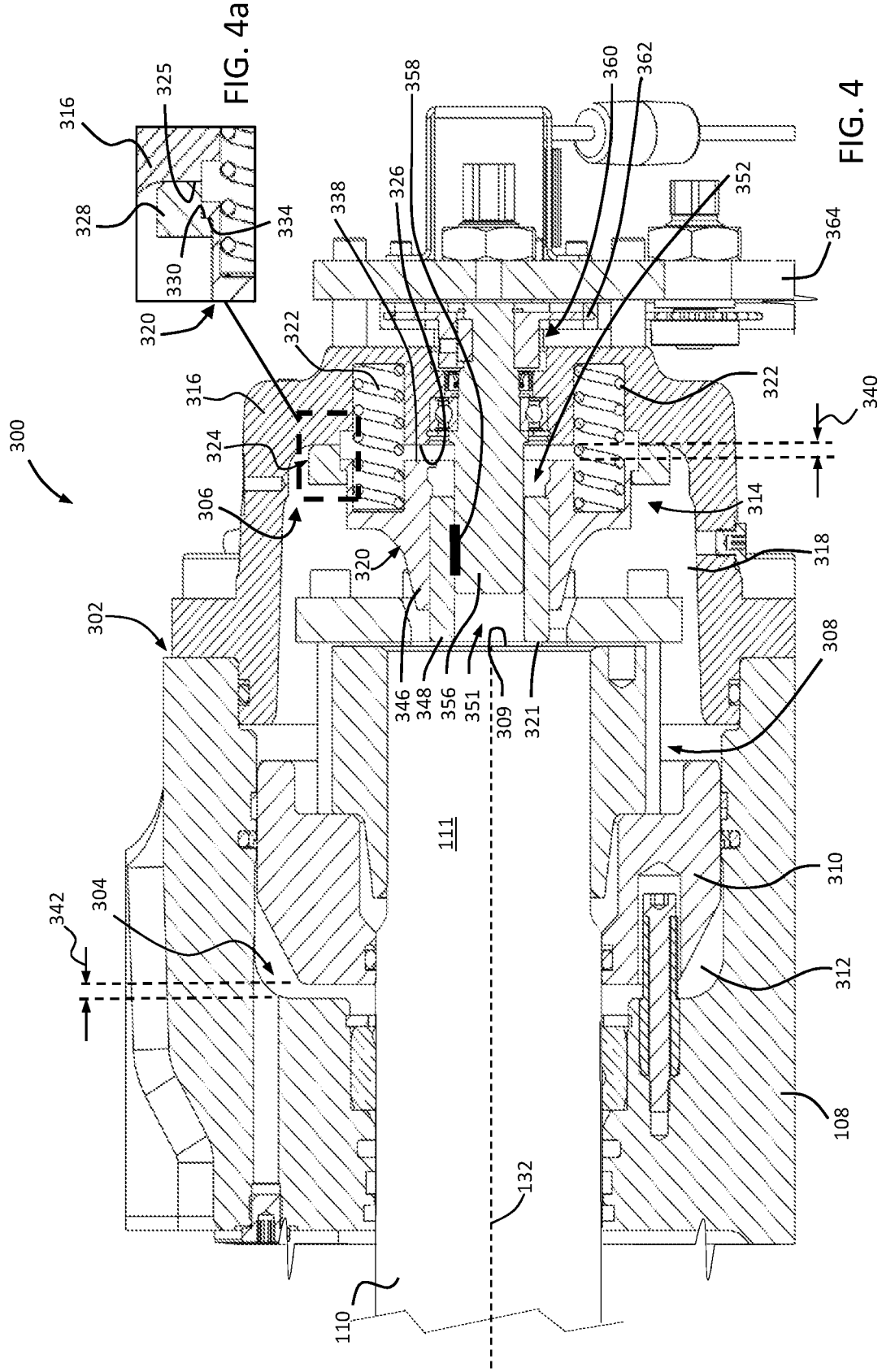

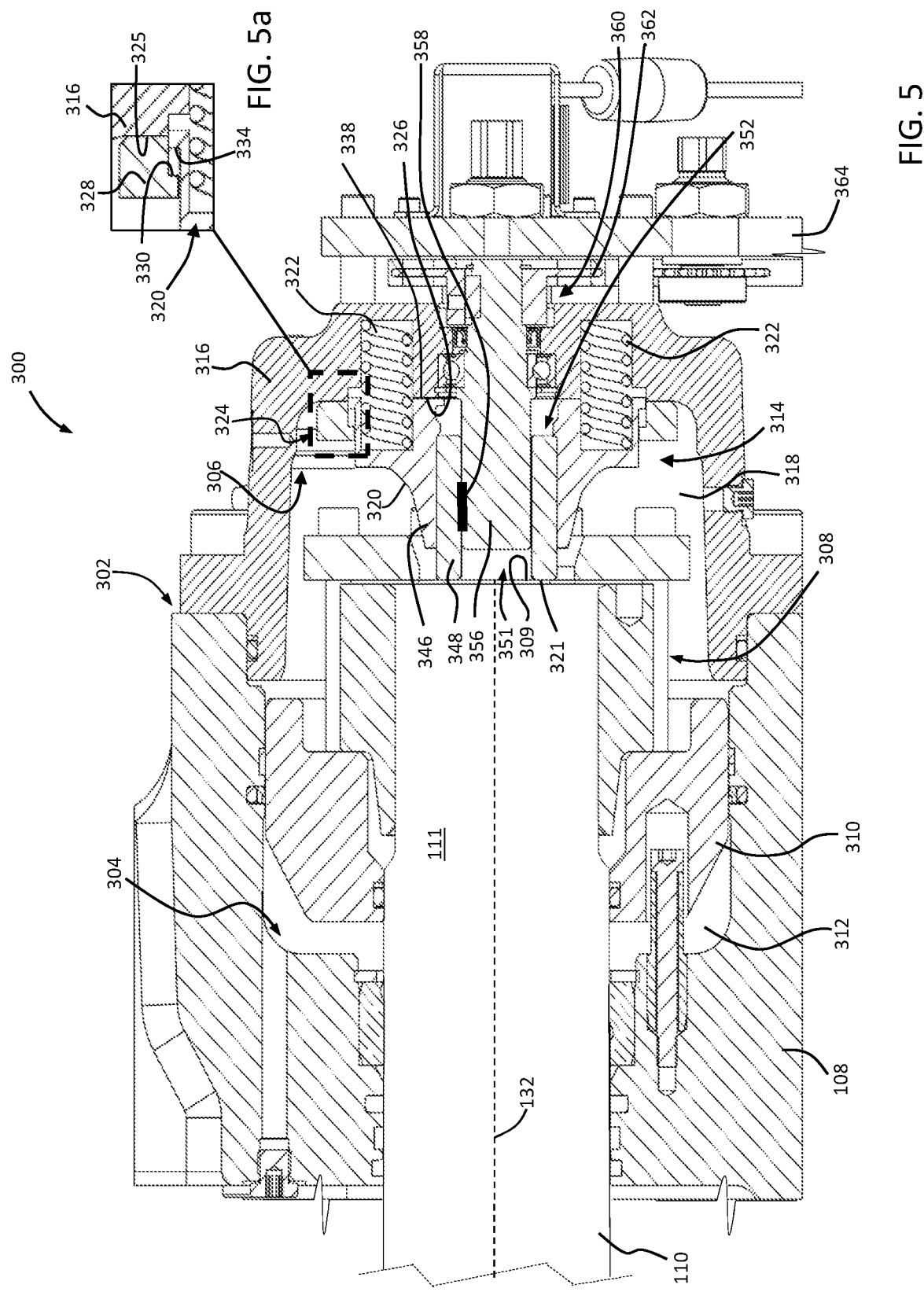

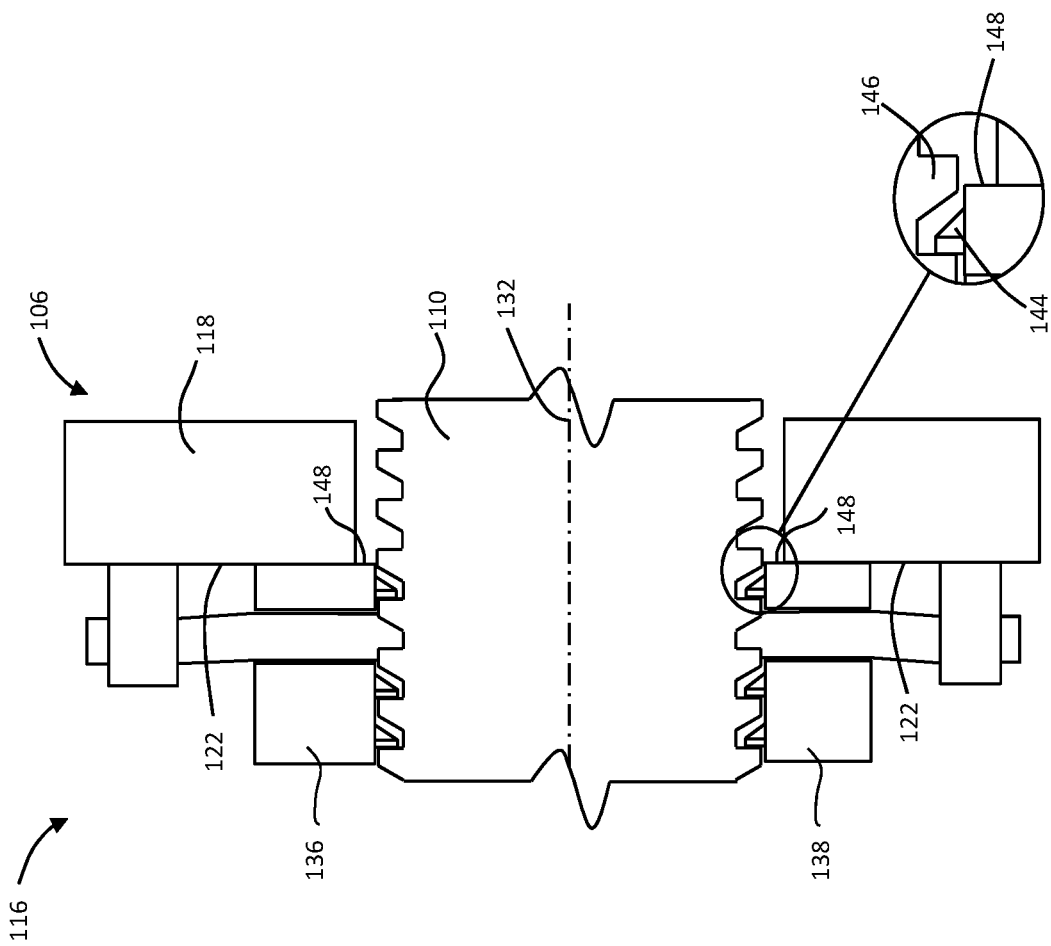

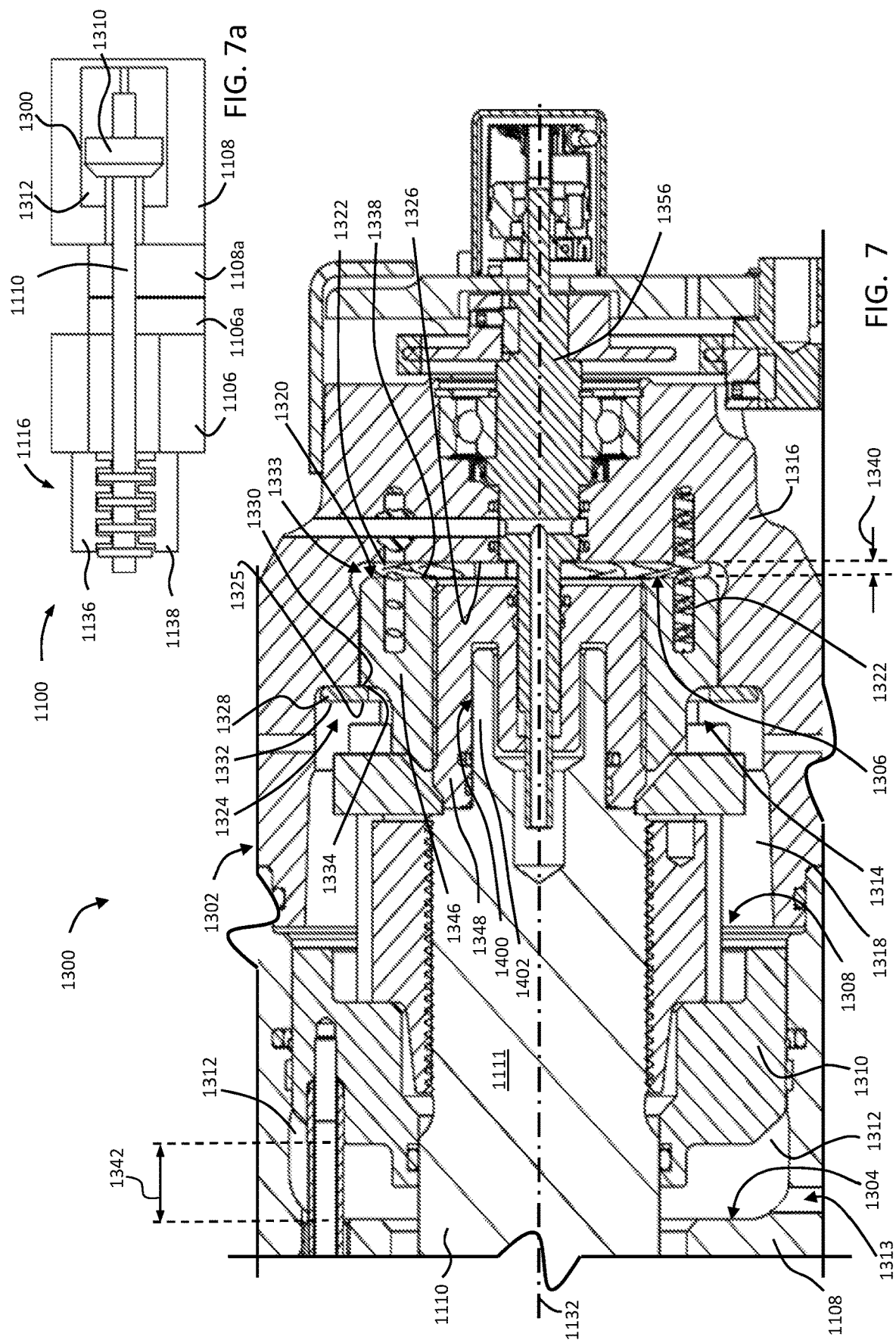

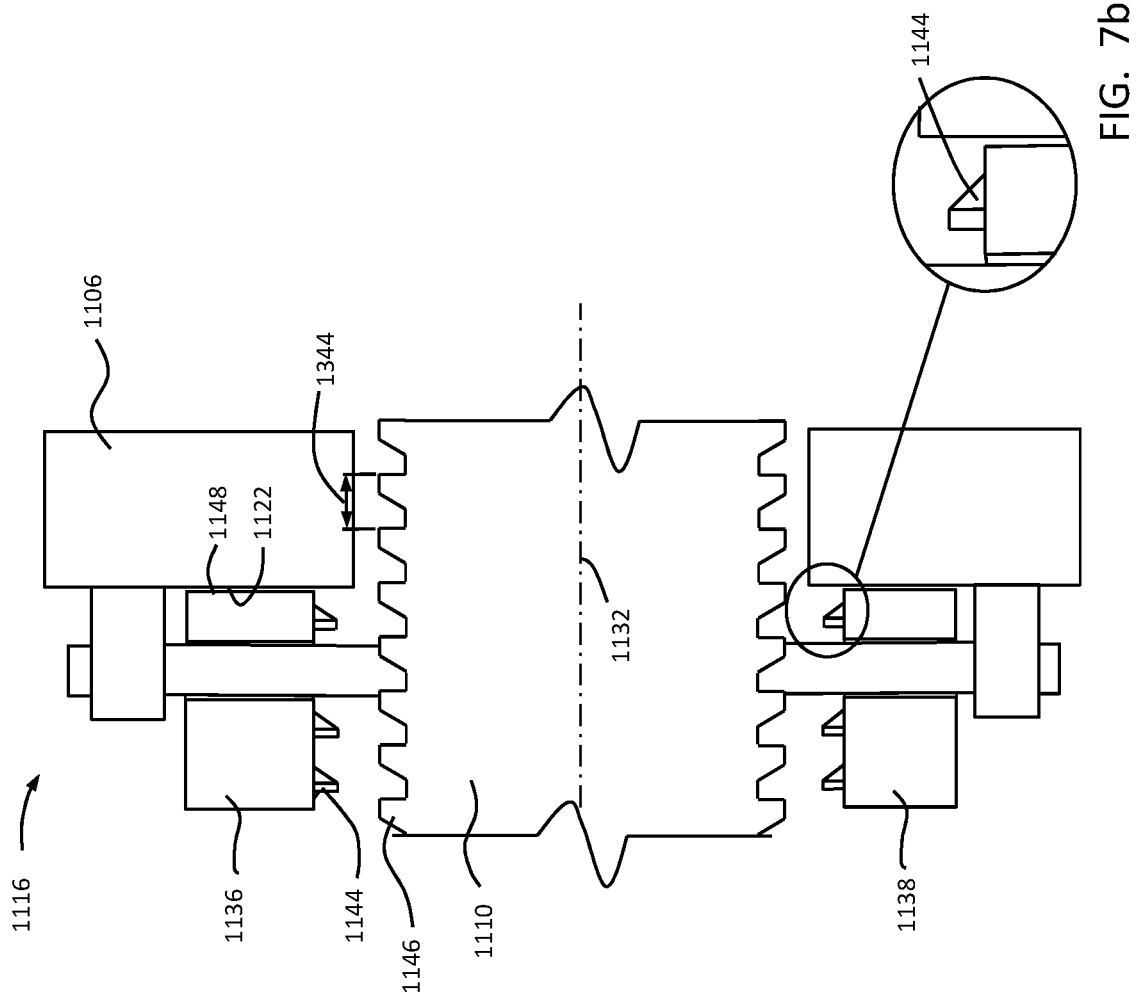

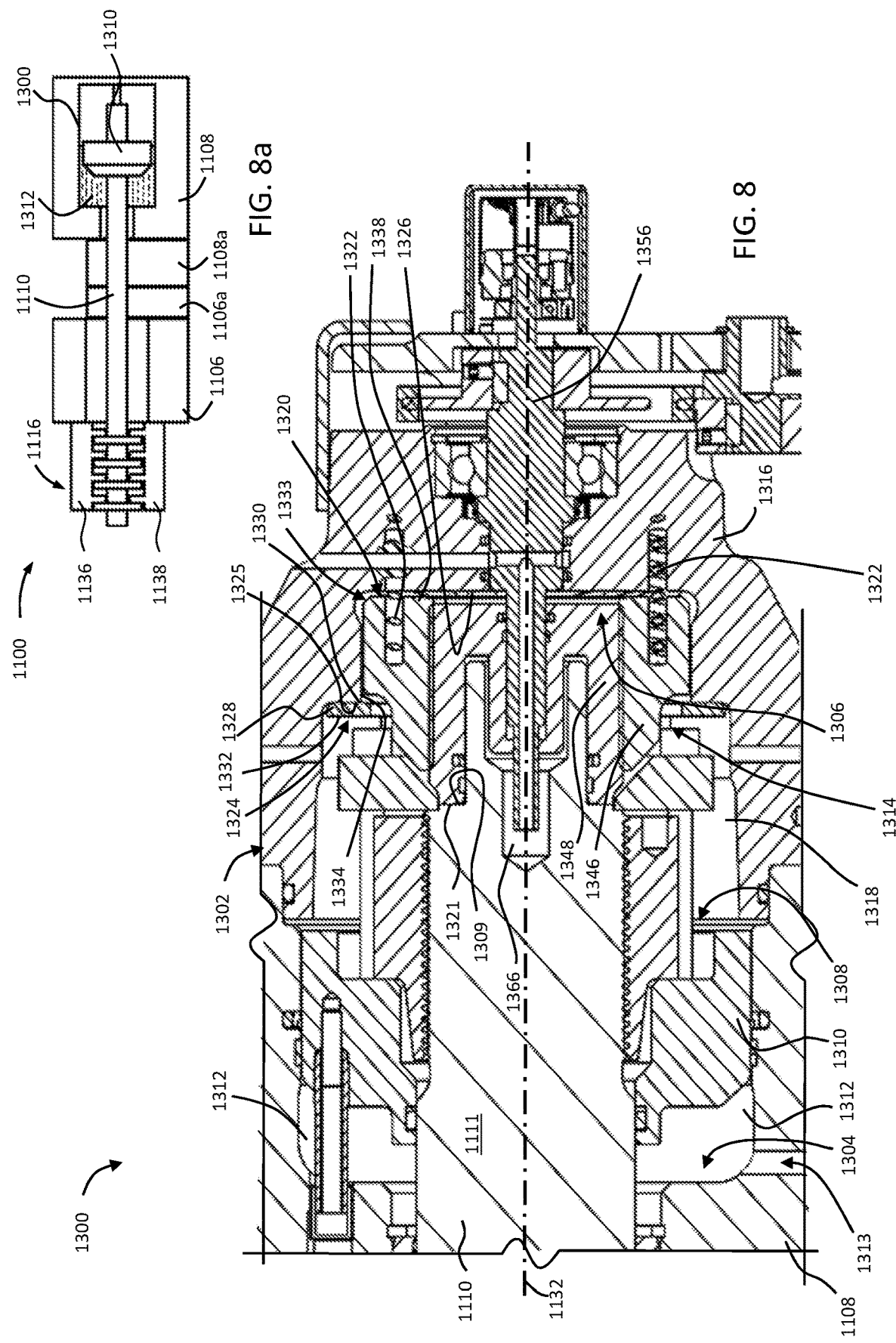

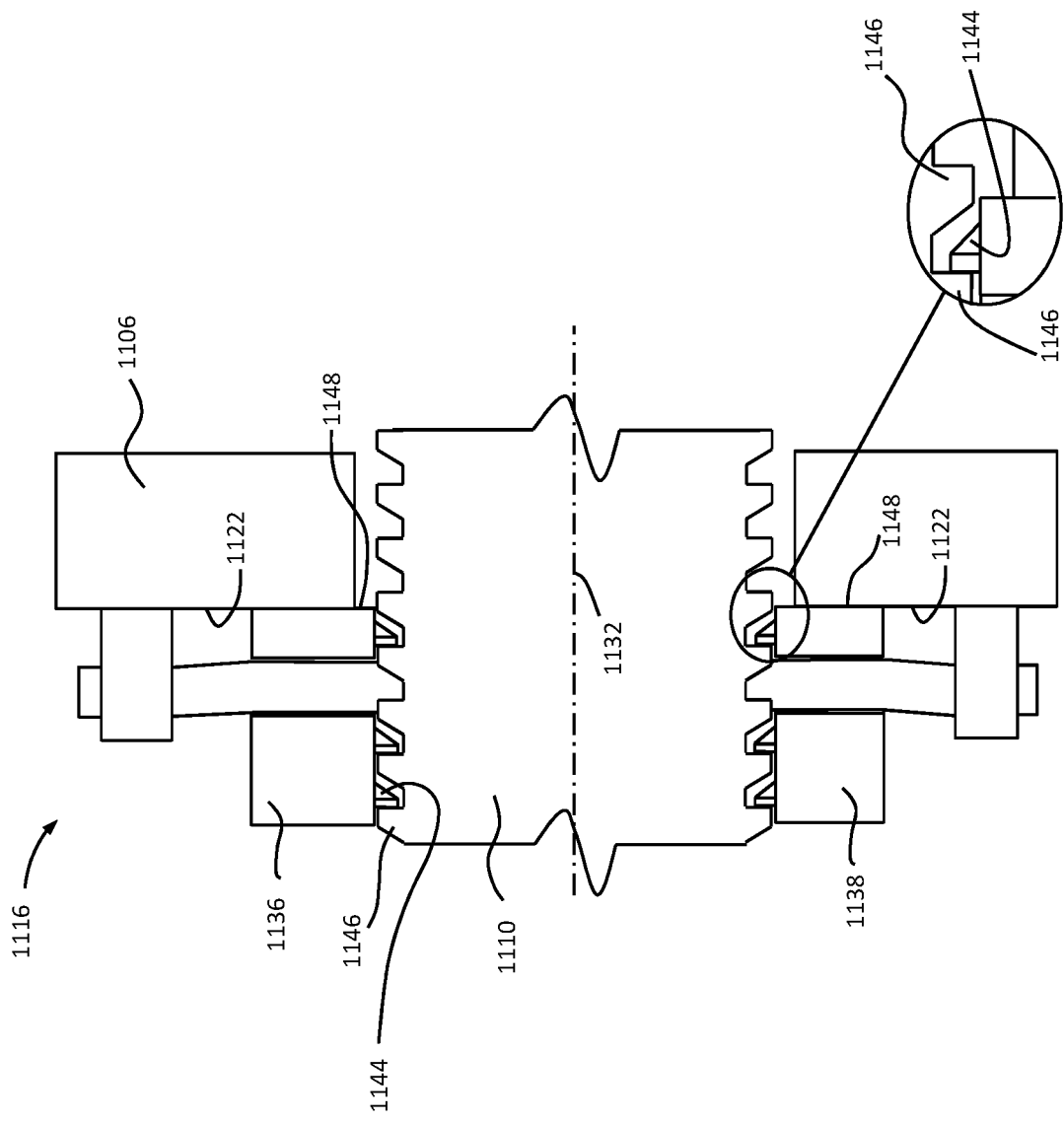

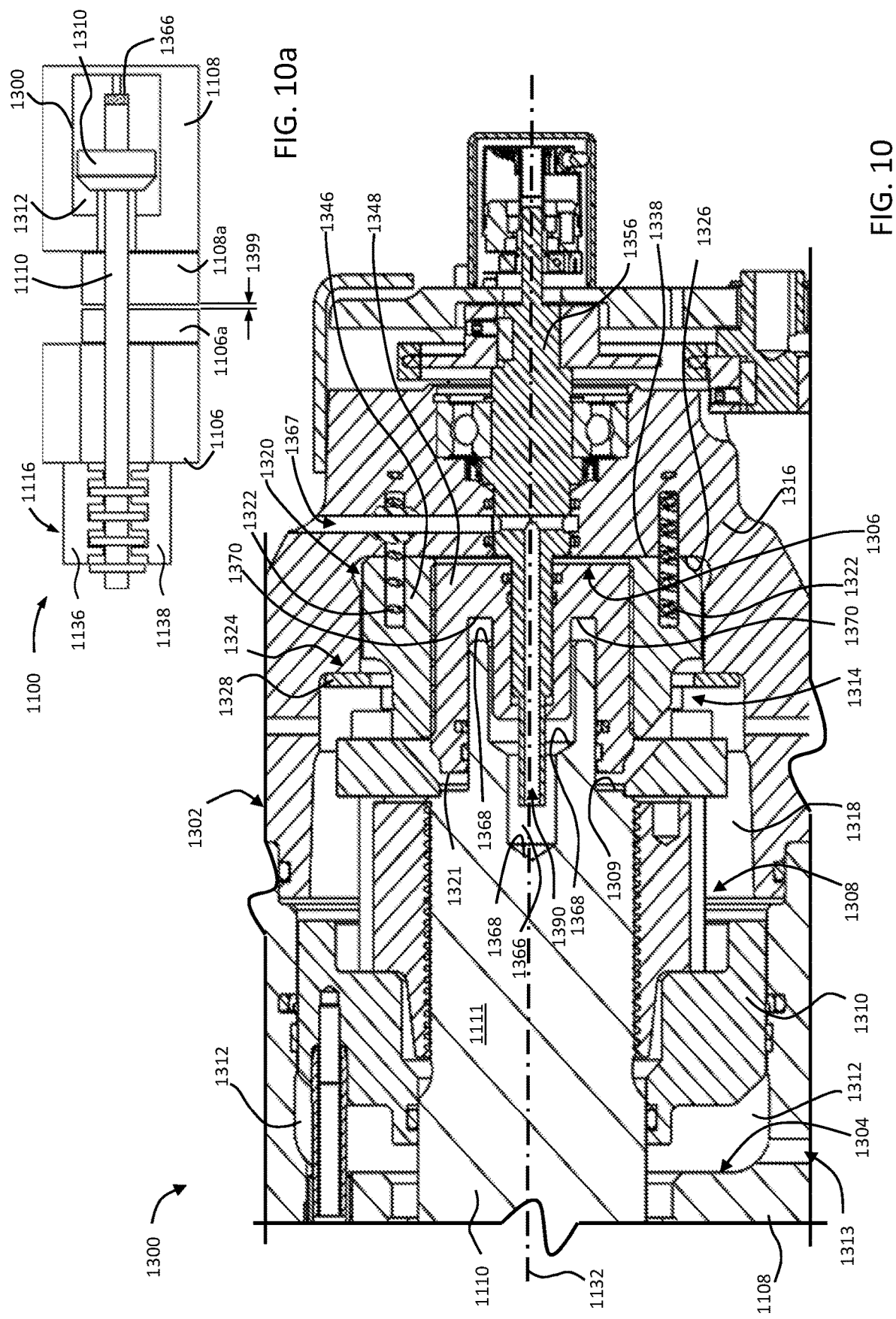

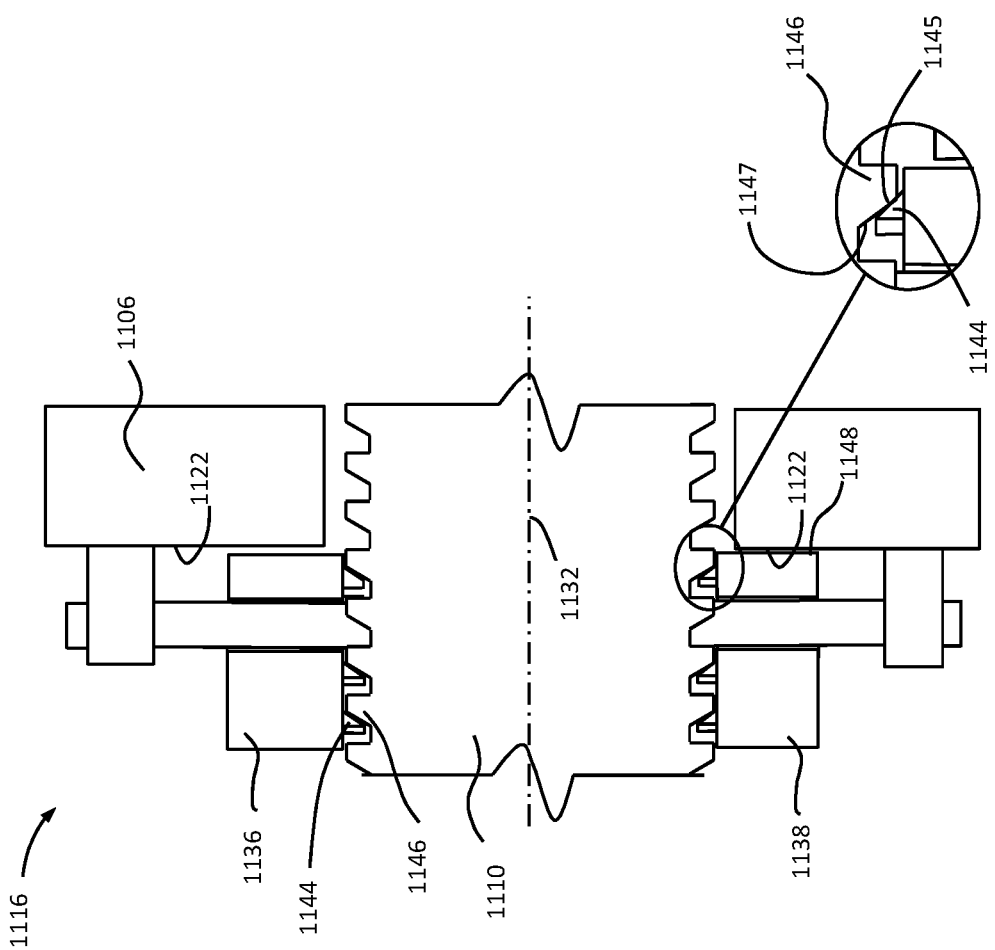

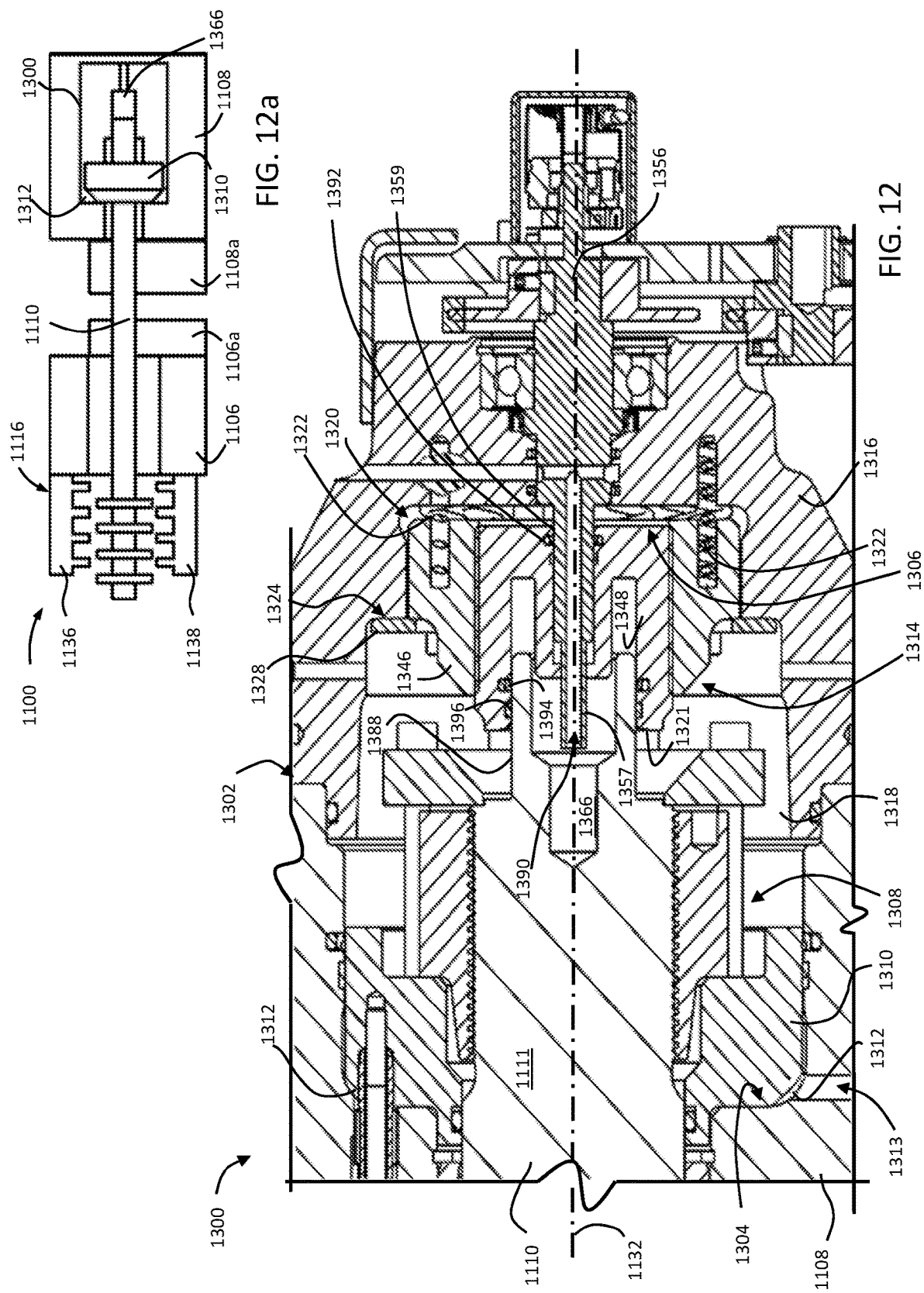

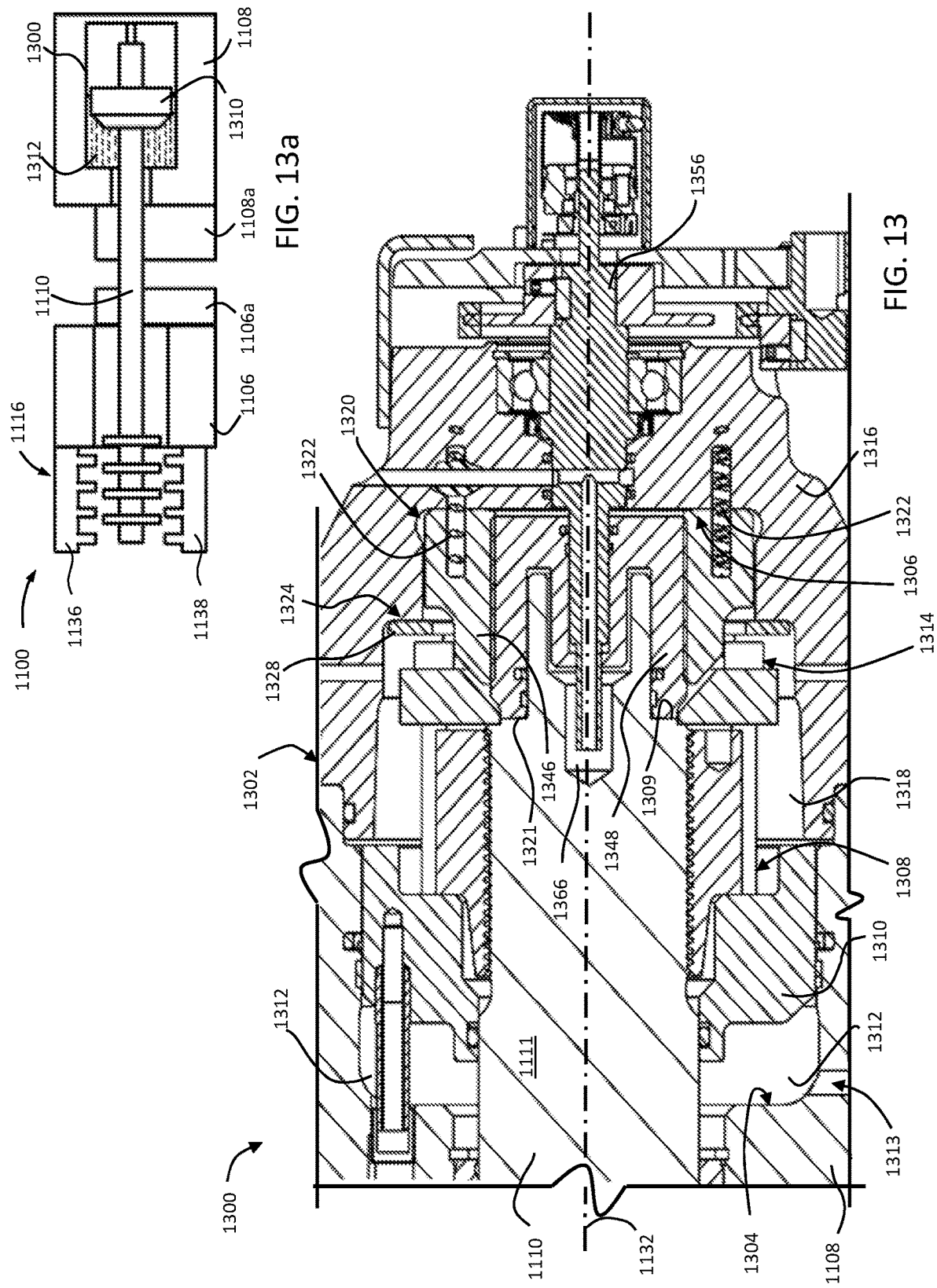

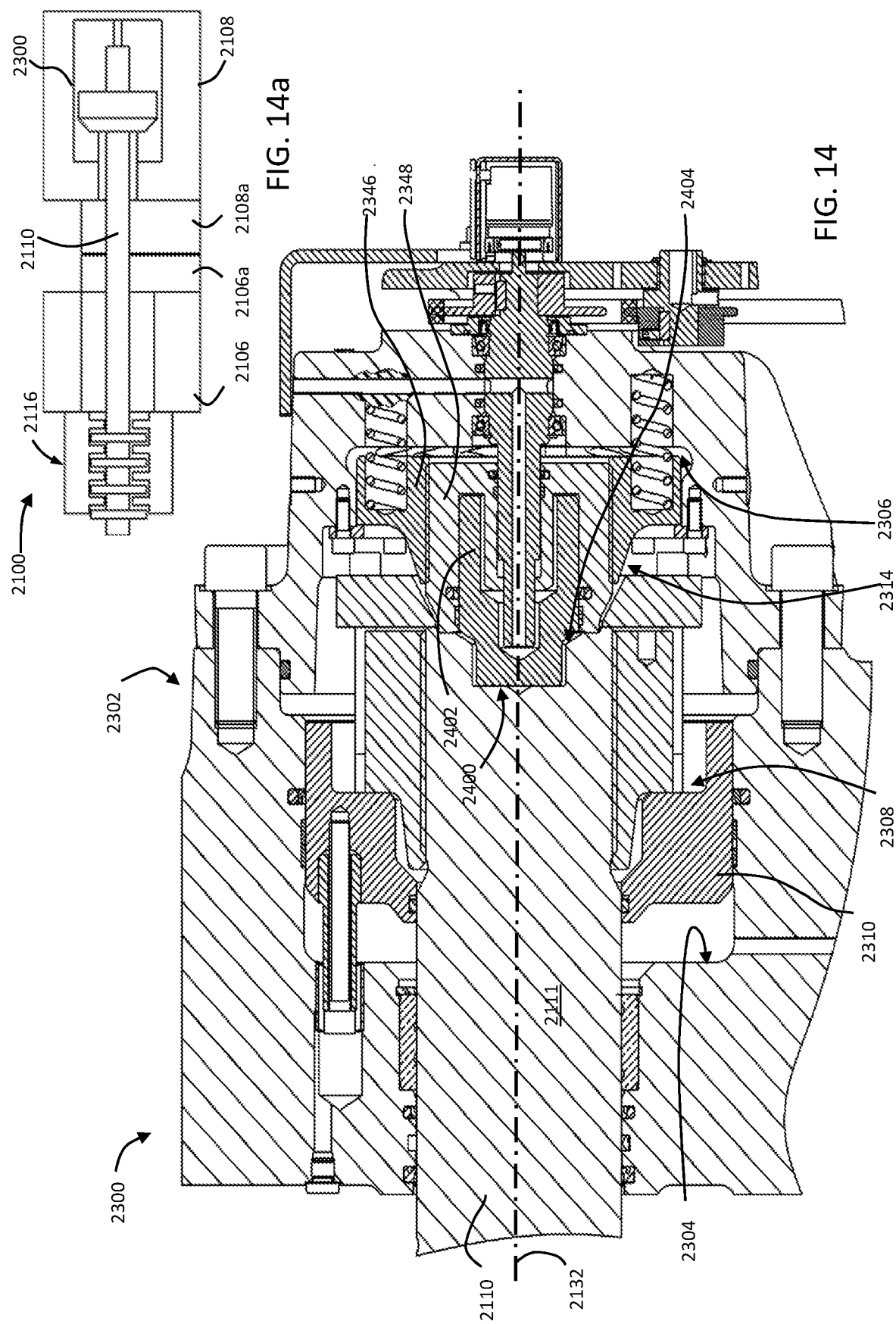

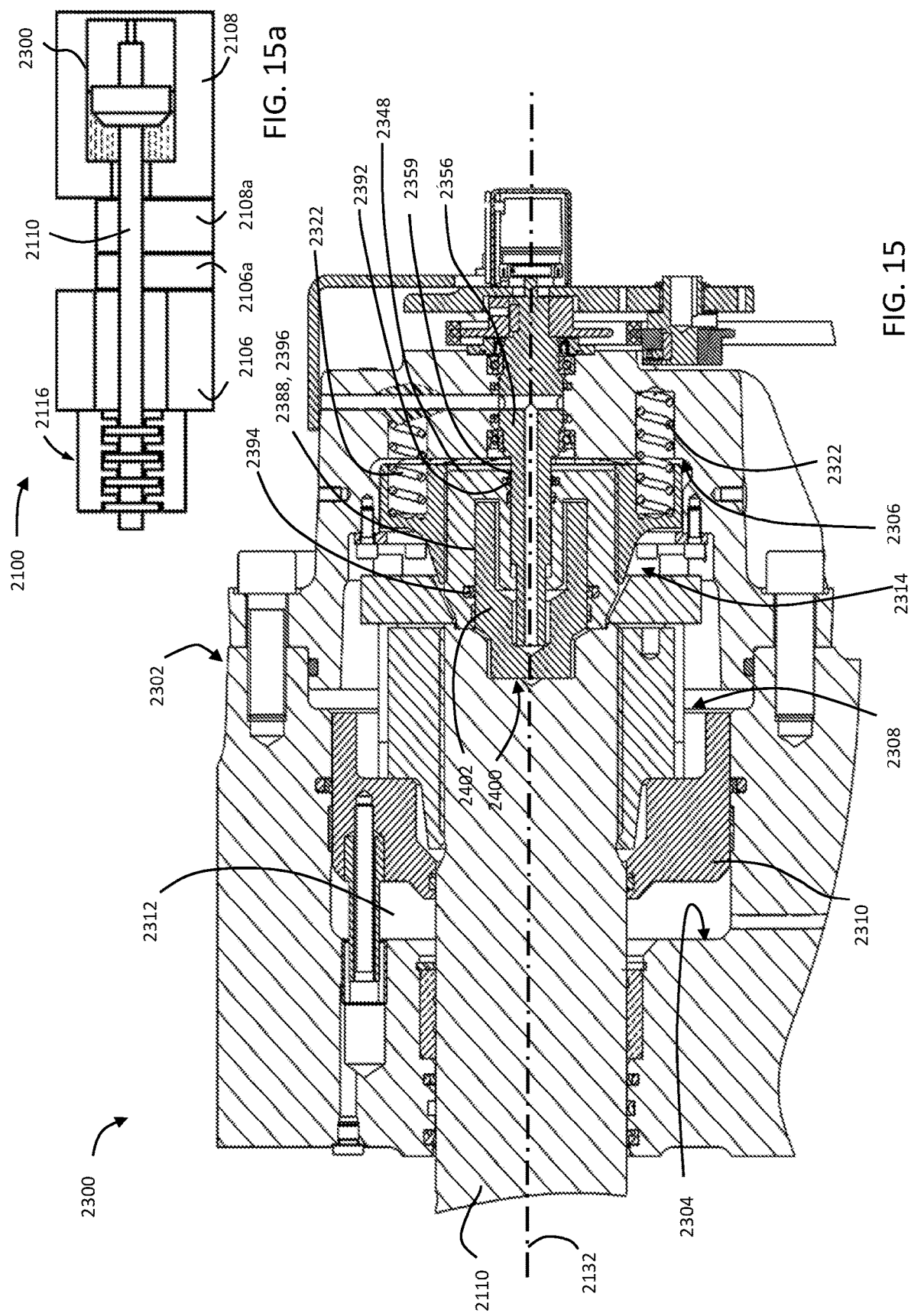

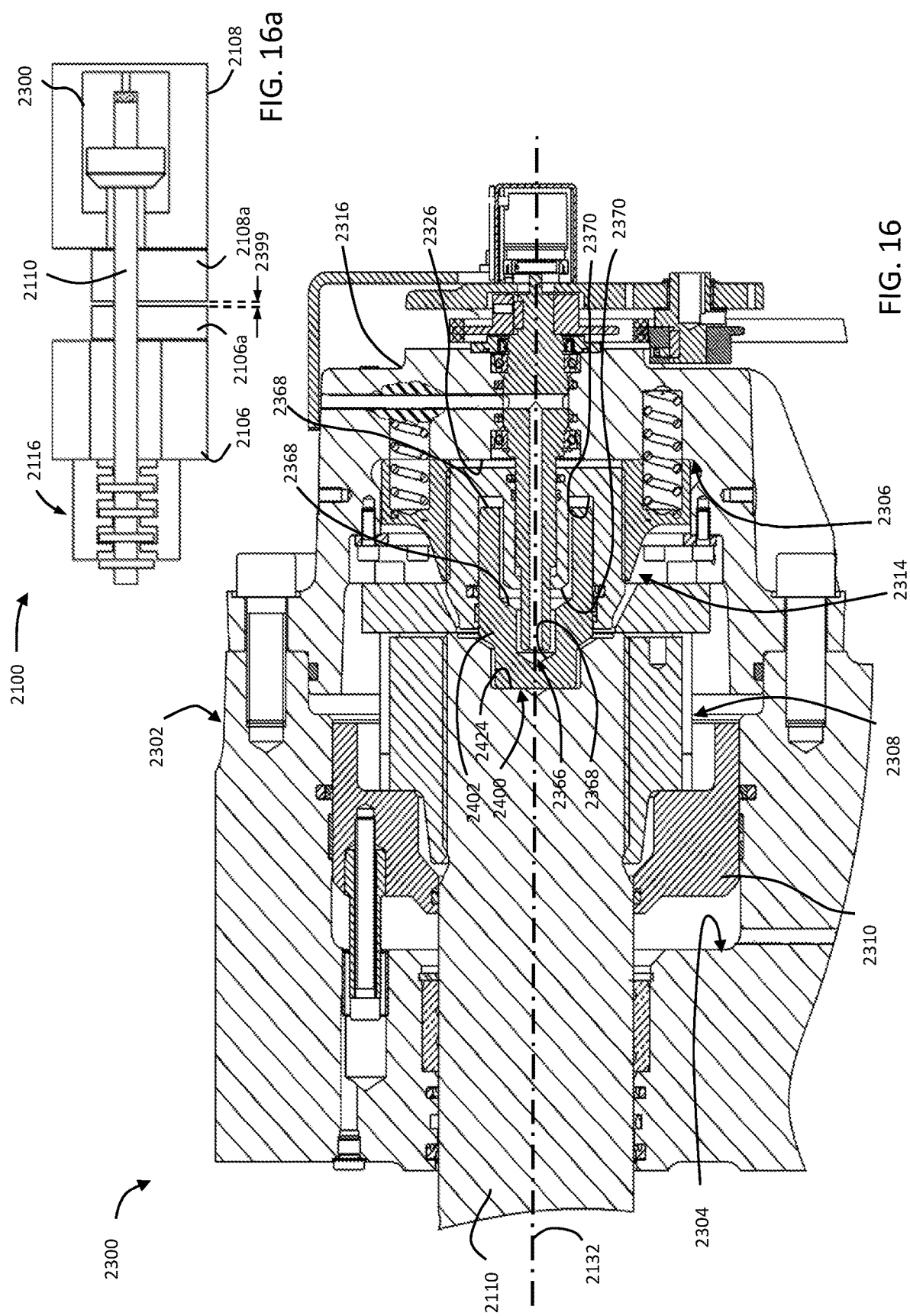

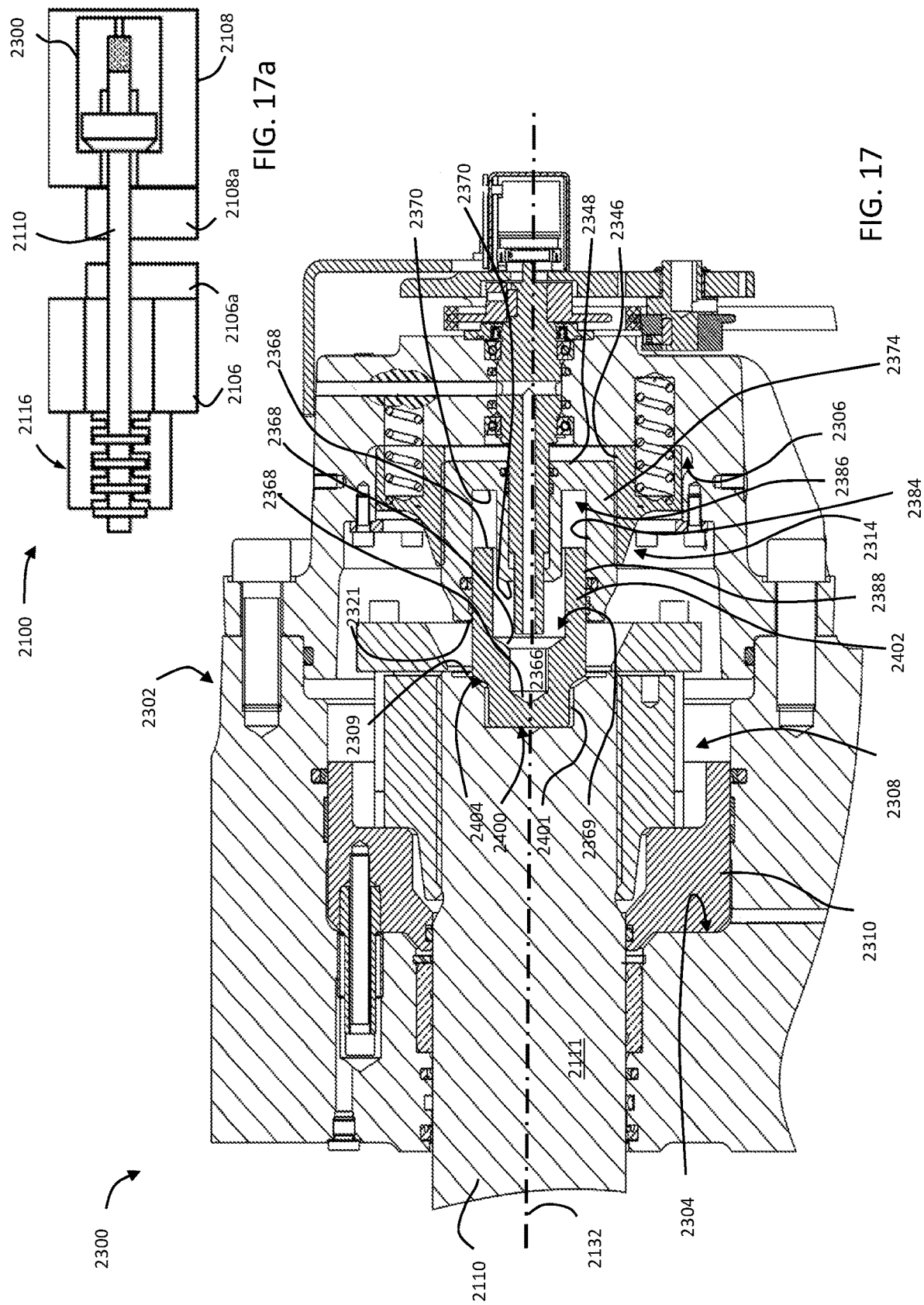

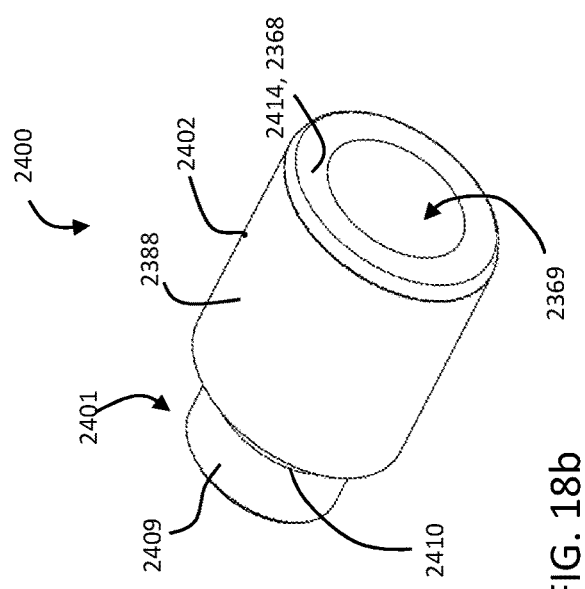
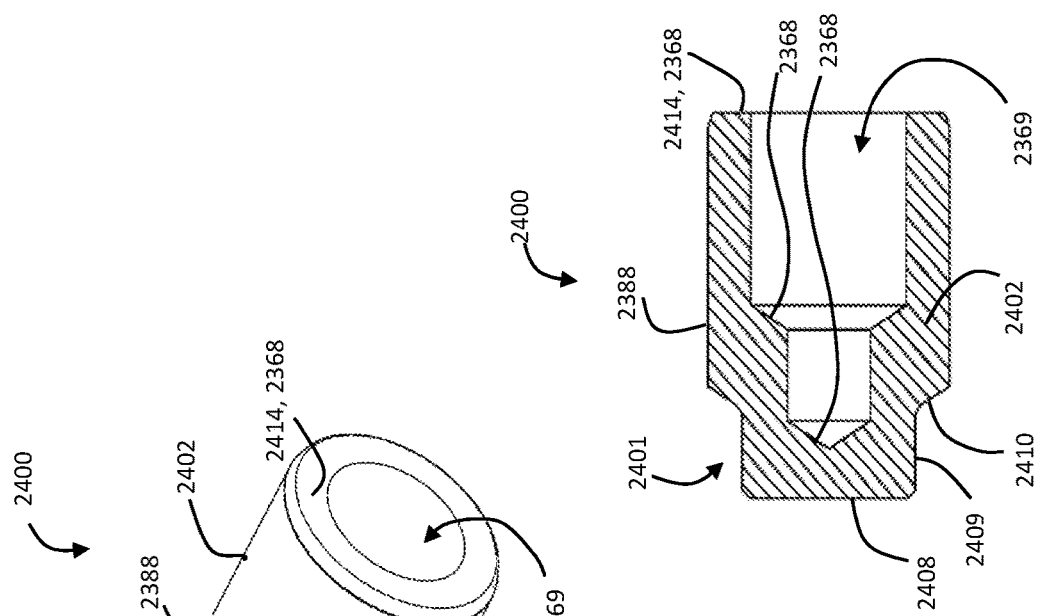
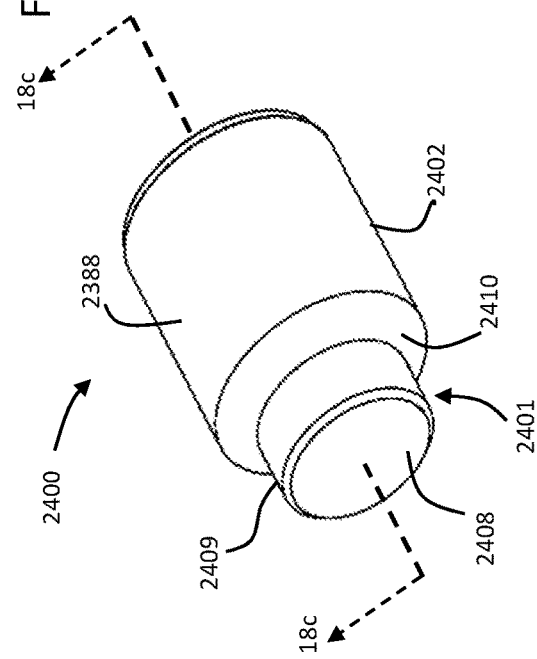
FIG. 18b
FIG. 18c
FIG. 18a

COMPACT CLAMP APPARATUS WITH INTEGRATED MOLD BREAK

This application is a continuation of PCT Patent Application Serial No. PCT/CA2015/051208, filed Nov. 19, 2015, which claims the benefit of Provisional Application Ser. No. 62/082,123, filed Nov. 19, 2014, and Provisional Application Ser. No. 62/185,127, filed Jun. 26, 2015, which is hereby incorporated herein by reference.

FIELD

The specification relates to injection molding machines, elements thereof, and methods and apparatuses for controlling motion of molds in an injection molding machine.

BACKGROUND

U.S. Pat. No. 4,874,309 (Mitsubishi) purports to disclose in a die clamping apparatus including a fixed die plate, a movable die plate, a device for moving the movable die plate relative to the fixed die plate, a device for fixedly coupling the fixed die plate with the movable die plate and tie bars for carrying out clamping of dies, the tie bars are fixedly secured to the fixed die plate and a hydraulic cylinder having a ram is provided on the movable die plate, or vice versa. The coupling device has a half-nut provided on the surface of the fixed die plate so as to be movable in the axial direction of the tie bar insert hole, and are provided on the outer circumference of the tip end of the tie bar and are adapted to mesh with the half-nut. A stopper is provided between the fixed die plate and the half-nut. A part of the ram is made to butt against the stopper to position the ram in the axial direction of the tie bar insert hole. The end surface of the half-nut opposed to the ram is brought into pressing contact with the ram. At that position, the half-nut can be positioned so as to mate with the threads on the tie bar.

U.S. Pat. No. 5,320,517 (Hirata) purports to disclose a clamping apparatus of molding machine including a base; a fixed board disposed on the base; a movable board movable relative to the fixed board; a plurality of mold clamping cylinders disposed in predetermined positions of the fixed board, the mold clamping cylinders each having a mold clamping piston with a tie bar reception hole and a tie bar connection device disposed on the mold clamping piston; a plurality of tie bars with a thread at their one end, the tie bars being disposed in correspondence with the mold clamping cylinders on the movable board; a plurality of mold opening/closing cylinders for moving the movable board; and an axially movable sleeve associated with each clamping cylinder for adjusting an axial position of an associated piston to adjust an engagement position of the tie bar connection device, the sleeve being disposed in an opening in the fixed board and forming an extension of the tie bar reception hole, with one end of the sleeve abutting against a reception wall provided in each piston surrounding the tie bar reception hole and the other end of the sleeve threadedly cooperating with an engagement adjustment screw ring secured to the fixed board.

U.S. Pat. No. 7,981,334 (Chiang) purports to disclose an injection molding machine and a method for mold-adjusting are provided. The injection molding machine comprises a mold-adjusting mechanism mounted to one side of the fixed platen and being coaxial with the tie bars. Each of the mold-adjusting mechanisms is constructed the same comprising a support frame (11), a motor (12), a mold-adjusting driving wheel (13), a mold-adjusting driven wheel (14), a hydraulic cylinder for positioning (15), a sensor and a control system.

U.S. Pat. No. 7,611,346 (Schad et al.) discloses a clamp actuator of a molding system that includes a first actuator configured to be interactable with a rod; and a second actuator configured to be interactable with the first actuator. The first actuator is configured to apply a clamping force to the rod; and the second actuator is configured to apply a force opposing the clamping force to the first actuator. Responsive to actuating the first actuator, the rod is drivable between (i) a home position in which a clamping force is not applicable to the rod, and (ii) a force application position in which the clamping force is applicable to the rod. Responsive to a mold flash occurring which exceeds the clamping force, the rod is moveable into a mold flash position beyond the home position.

SUMMARY

The following summary is intended to introduce the reader to various aspects of the applicant's teaching, but not to define any invention. In general, disclosed herein are one or more methods or apparatuses related to injection molding, and to closing, clamping, and opening a mold of an injection molding machine.

According to some aspects of the teaching disclosed herein, a clamp assembly for an injection molding machine, comprises: (a) a clamp cylinder housing having an inner end and an outer end spaced axially apart from the inner end; (b) a clamp piston comprising a piston head affixed to an end portion of a tie bar, the clamp piston slidable within the housing among a clamping position, a mold break position, and a meshing position disposed axially intermediate the clamping position and the mold break position; (c) a clamp chamber axially bounded by opposed surfaces of the piston head and the inner end of the cylinder housing for urging the clamp piston towards the clamping position when pressurized; (d) a return device axially intermediate the clamp piston and the outer end of the cylinder housing, the return device including a return device engagement surface resiliently bearing against a clamp piston abutment surface fixed relative to the clamp piston when the clamp piston moves between the meshing position and the clamping position, the return device engagement surface moving towards the outer end of the housing upon movement of the clamp piston to the clamping position when the clamp chamber is pressurized, and the return device engagement surface movable away from the outer end of the housing to an engagement surface advanced position for pushing the clamp piston from the clamping position back to the meshing position when pressure in the clamp chamber is relieved; and (e) a mold break chamber bounded axially by a tie bar mold break surface of the tie bar and an opposed return device mold break surface of the return device, for urging the clamp piston to the mold break position when pressurized.

In some examples, the mold break chamber is in fluid isolation from the piston head.

In some examples, the mold break chamber is in fluid isolation from the return device engagement surface.

In some examples, the clamp piston abutment surface comprises a tie bar engagement surface of the tie bar.

In some examples, the clamp piston abutment surface bears against the return device engagement surface when the clamp piston moves from the meshing position to the clamping position.

In some examples, the return device engagement surface bears against the clamp piston abutment surface when the clamp piston moves from the clamping position to the meshing position.

In some examples, the clamp piston abutment surface is spaced apart from the return device engagement surface when the clamp piston is in the mold break position.

In some examples, the return device and the tie bar inter-engage in sealed sliding fit to enclose the mold break chamber.

In some examples, the mold break chamber has a larger volume when the clamp piston is in the mold break position than when the clamp piston is in the meshing position.

In some examples, the mold break chamber has a first volume when the clamp piston is in the meshing position and the return device engagement surface bears against the clamp piston abutment surface, and the mold break chamber has a second volume when the clamp piston is in the mold break position and the return device engagement surface is spaced apart from the clamp piston abutment surface, the second volume greater than the first volume.

In some examples, the mold break chamber has a volume that remains generally constant when the clamp piston moves between the meshing and clamping positions.

In some examples, the mold break chamber comprises a tie bar cavity in the tie bar.

In some examples, the tie bar comprises a tie bar extension projecting towards the outer end of the clamp cylinder housing, and the tie bar extension and the return device inter-engage in sealed sliding fit to enclose the mold break chamber.

In some examples, the tie bar mold break surface comprises a portion of the tie bar extension.

In some examples, at least a portion of the tie bar cavity is disposed in the tie bar extension.

In some examples, the tie bar extension is radially movable relative to the tie bar.

In some examples, the tie bar comprises a tie bar recess and the tie bar extension is disposed in the tie bar recess.

In some examples, the mold break chamber comprises a return device recess in the return device.

In some examples, the clamp assembly further comprises a bore extending axially through the return device, the bore providing a passageway for fluid communication between an exterior of the housing and the mold break chamber.

In some examples, the clamp assembly further comprises a shaft passing through the bore, wherein the passageway comprises an internal fluid conduit extending lengthwise of the shaft.

In some examples, the return device is movable away from the outer end of the housing to an advanced position in which a catch surface fixed to the return device abuts a stop surface fixed to the housing.

In some examples, the axial location of the return device engagement surface, when the return device is in the advanced position, is adjustable relative to the housing to adjust the axial location of the meshing position in response to changes in mold height.

In some examples, the engagement surface advanced position is adjustable relative to the housing over an axial adjustment length for accommodating changes in the axial location of the meshing position in response to changes in mold height.

In some examples, when the return device engagement surface is in the engagement surface advanced position, a catch surface fixed to the return device abuts a stop surface fixed to the housing to inhibit further axial movement of the return device engagement surface away from the outer end of the housing.

In some examples, the return device comprises a plunger core having an externally threaded outer surface and a plunger collar having an internally threaded collar bore receiving the plunger core in threaded engagement, the catch surface fixed to the plunger collar and the return device engagement surface fixed to the plunger core, the plunger core rotatable relative to the plunger collar for adjusting the axial location of the engagement surface advanced position relative to the housing over the axial adjustment length.

In some examples, the return device engagement surface comprises an endface of the plunger core.

In some examples, the catch surface comprises a shoulder extending radially outwardly from an outer surface of the plunger collar.

In some examples, the clamp assembly further comprises a core bore extending axially through the plunger core, the core bore providing a passageway for fluid communication between an exterior of the housing and the mold break chamber.

In some examples, the clamp assembly further comprises a shaft passing through the core bore, wherein the passageway comprises an internal fluid conduit extending lengthwise of the shaft.

In some examples, the shaft comprises a shaft seal portion extending along a first axial length of the shaft for engaging with a first seal.

In some examples, the shaft has a shaft torque transfer surface extending along a second axial length of the shaft for engaging a plunger torque transfer surface fixed to the plunger core, the plunger core rotationally locked with the shaft and axially translatable relative to the shaft along the torque transfer surfaces.

In some examples, the shaft torque transfer surface comprises diametrically opposed wrench flats, and the plunger torque transfer surface comprises locking tabs extending radially inwardly of the core bore to engage the wrench flats.

In some examples, at least a portion of the shaft torque transfer surface is disposed within the mold break chamber.

In some examples, the tie bar extends longitudinally along a tie bar axis, the tie bar axis passing through a portion of the mold break chamber.

According to some aspects of the teaching disclosed herein, a method of unclamping a mold in an injection molding machine comprises: (a) relieving pressure in a clamp chamber, the clamp chamber urging a clamp piston affixed to a tie bar towards a clamping position when pressurized; and (b) pressurizing a mold break chamber to urge the clamp piston into a mold break position, the mold break chamber bounded axially by a tie bar mold break surface of the tie bar and an opposed return device engagement surface of a return device, the return device for urging the clamp piston towards a meshing position when pressure in the clamp chamber is relieved, the meshing position axially intermediate the mold break and the clamping positions.

In some examples, during step (b), the clamp piston moves towards the mold break position and a moving platen coupled to the tie bar via a locking assembly moves away from a stationary platen to which the clamp chamber is affixed.

According to some aspects of the teaching disclosed herein, a clamp assembly for an injection molding machine comprises: (a) a clamp cylinder housing; (b) a clamp piston affixed to an end portion of a tie bar and slidable within the housing among a clamping position, a mold break position, and a meshing position disposed axially intermediate the clamping and the mold break positions; (c) a clamp chamber disposed within the housing for urging the clamp piston towards the clamping position when pressurized; (d) a return device disposed within the housing for urging the clamp piston towards the meshing position when pressure in the clamp chamber is relieved; and (e) a mold break chamber bounded axially by a tie bar mold break surface of the tie bar and a return device mold break surface of the return device, the mold break chamber for urging the clamp piston towards the mold break position when pressurized.

In some examples, the clamp piston bears against the return device when the clamp piston moves from the meshing position to the clamping position.

In some examples, the return device bears against the clamp piston when the clamp piston moves from the clamping position to the meshing position.

In some examples, the return device and the tie bar inter-engage in sealed sliding fit to enclose the mold break chamber.

In some examples, the mold break chamber has a larger volume when the clamp piston is in the mold break position than when the clamp piston is in the meshing position.

In some examples, the mold break chamber has a volume that remains generally constant when the clamp piston moves between the meshing and clamping positions.

In some examples, the mold break chamber comprises a tie bar cavity in the tie bar.

In some examples, the mold break chamber comprises a return device recess in the return device.

In some examples, the clamp assembly further comprises a bore extending axially through the return device, the bore providing a passageway for fluid communication between an exterior of the housing and the mold break chamber.

In some examples, the tie bar extends longitudinally along a tie bar axis, the tie bar axis passing through a portion of the mold break chamber.

According to some aspects of the teaching disclosed herein, a clamp assembly for an injection molding machine comprises: (a) a clamp cylinder housing having an inner end and an outer end spaced axially apart from the inner end; (b) a clamp piston comprising a piston head affixed to an end portion of a tie bar, the clamp piston slidable within the housing; (c) a clamp chamber axially intermediate the piston head and the inner end of the housing for urging the clamp piston from a meshing position towards the outer end of the housing when pressurized; (d) a return device axially intermediate the piston head and the outer end of the housing, the return device accommodating movement of the clamp piston from the meshing position towards the outer end of the housing when the clamp chamber is pressurized, the return device having a return device engagement surface movable away from the outer end of the housing to an engagement surface advanced position for pushing the clamp piston back to the meshing position when pressure in the clamp chamber is relieved; and (e) a mold break chamber within the housing for urging the clamp piston from the meshing position towards the inner end of the housing when pressurized.

In some examples, the return device engagement surface resiliently bears against the clamp piston when pushing the clamp piston from the outer end of the housing to the meshing position.

In some examples, the mold break chamber has a volume that remains generally constant when the clamp piston moves from the meshing position toward the outer end of the housing.

In some examples, the mold break chamber is in fluid isolation from the piston head.

In some examples, the axial location of the engagement surface advanced position is infinitely adjustable relative to the housing over an axial adjustment length for accommodating changes in the axial location of the meshing position in response to changes in mold height.

In some examples, the return device is coupled to an adjustment actuator, and wherein rotation of the adjustment actuator adjusts the axial location of the engagement surface advanced position relative to the housing over the axial adjustment length.

In some examples, the clamp assembly further comprises a stop surface within the housing for engagement by a catch surface fixed to the return device, the catch surface engaging the stop surface when the return device engagement surface is in the engagement surface advanced position to inhibit further axial travel of the return device engagement surface away from the outer end of the housing.

In some examples, the mold break chamber is bounded axially by a tie bar mold break surface of the tie bar and an opposed return device mold break surface of the return device.

In some examples, the return device and the tie bar inter-engage in sealed sliding fit to enclose the mold break chamber.

In some examples, the mold break chamber comprises a tie bar cavity in the tie bar and a return device recess in the return device.

In some examples, the clamp assembly further comprises a bore extending axially through the return device, the bore providing a passageway for fluid communication between an exterior of the housing and the mold break chamber.

In some examples, the mold break chamber is bounded axially by a housing mold break surface fixed relative to the housing and an opposed return device mold break surface of the return device, the housing mold break surface directed towards the inner end of the housing and the return device mold break surface directed toward the outer end of the housing.

In some examples, the return device comprises a plunger movable within the housing and relative to the clamp piston, the return device mold break surface fixed to the plunger, and wherein the mold break chamber urges the plunger towards the inner end of the housing when pressurized for pushing the clamp piston from the meshing position towards the inner end of the housing.

In some examples, the return device engagement surface is coupled to the plunger and pushes the clamp piston axially apart from the plunger.

In some examples, the clamp assembly further comprises a stop surface fixed relative to the clamp piston for engagement by a catch surface fixed to the plunger to limit axial travel of the return device engagement surface away from the plunger.

In some examples, the clamp assembly further comprises a return device adjustment surface axially fixable relative to the housing, the plunger abutting the return device adjustment surface during movement of the clamp piston from the meshing position toward the outer end of the housing when the clamp chamber is pressurized, and during movement of the return device engagement surface away from the outer end of the housing to the engagement surface advanced position when pressure in the clamp chamber is relieved.

In some examples, the axial location of the return device adjustment surface is adjustable relative to the housing for adjusting the engagement surface advanced position over the axial adjustment length.

In some examples, the return device comprises a plurality of springs axially captive between the clamp piston and the plunger, the springs pushing the return device engagement surface against the clamp piston and urging the clamp piston and the plunger axially apart.

According to some aspects of the teaching disclosed herein, a method of operating a clamp assembly of an injection molding machine comprises: (a) relieving pressure in a mold break chamber, the mold break chamber for urging a piston assembly affixed to a tie bar from a meshing position towards an inner end of a clamp housing when pressurized to urge apart mold halves of the injection molding machine; (b) pressurizing a clamp chamber to urge the piston assembly towards an outer end of the housing; and (c) relieving pressure in the clamp chamber and moving a return device engagement surface of a return device away from the outer end of the housing and to an engagement surface advanced position, the return device engagement surface pushing the piston assembly to the meshing position during movement to the engagement surface advanced position.

In some examples, the method further comprises repeating steps (a) to (c) during successive machine cycles with a first mold defining a first axial location for the meshing position; and after changing the first mold to a second mold defining a second axial location for the meshing position, adjusting the engagement surface advanced position to correspond to the second axial location for the meshing position.

In some examples, when the return device engagement surface is in the engagement surface advanced position, a catch surface of the return device abuts a stop surface within the housing to limit further axial movement of the return device engagement surface away from the outer end of the housing.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is an enlarged schematic view of the lock assembly of FIG. 2, shown in another condition;

FIG. 4 is an enlarged view of the clamp assembly structure of FIG. 2, shown in the first condition;

FIG. 4a is an enlarged view of a portion of the clamp assembly structure of FIG. 4;

FIG. 5 is an enlarged view of the clamp assembly structure of FIG. 2, shown in another condition;

FIG. 5a is an enlarged view of a portion of the clamp assembly structure of FIG. 5;

FIG. 6 is an enlarged schematic view of the lock assembly of FIG. 2, shown in another condition;

FIG. 7 is a cross-sectional view of an alternate clamp assembly structure for use with an injection molding machine like that of FIG. 1, shown in a first condition;

FIG. 7a is a schematic view of lock, clamp, and mold portions of an injection molding machine, shown in a first condition corresponding to the configuration of the clamp assembly structure shown in FIG. 7;

FIG. 7b is a more detailed schematic view of the lock portion of FIG. 7a, shown in another condition;

FIG. 8 is a cross-sectional view of the clamp assembly structure of FIG. 7, shown in another condition;

FIG. 8a is a schematic view of the lock, clamp, and mold portions of FIG. 7a, shown in another condition corresponding to the configuration of the clamp assembly structure shown in FIG. 8;

FIG. 8b is a more detailed schematic view of the lock portion of FIG. 8a;

FIG. 10 is a cross-sectional view of the clamp assembly structure of FIG. 7, shown in another condition;

FIG. 10a is a schematic view of the lock, clamp, and mold portions of FIG. 7a, shown in another condition corresponding to the configuration of the clamp assembly structure shown in FIG. 10;

FIG. 10b is a more detailed schematic view of the lock portion of FIG. 10a;

FIG. 12 is a cross-sectional view of the clamp assembly structure of FIG. 7, shown in another condition;

FIG. 12a is a schematic view of the lock, clamp, and mold portions of FIG. 7a, shown in another condition corresponding to the configuration of the clamp assembly structure shown in FIG. 12;

FIG. 13 is a cross-sectional view of the clamp assembly structure of FIG. 7, shown in another condition;

FIG. 13a is a schematic view of the lock, clamp, and mold portions of FIG. 7a, shown in another condition corresponding to the configuration of the clamp assembly structure shown in FIG. 13;

FIG. 14 is a cross-sectional view of another alternate clamp assembly structure for use with an injection molding machine, shown in a first condition;

FIG. 14a is a schematic view of lock, clamp, and mold portions of an injection molding machine, shown in a first condition corresponding to the configuration of the clamp assembly structure shown in FIG. 14;

FIG. 15 is a cross-sectional view of the clamp assembly structure of FIG. 14, shown in another condition;

FIG. 15a is a schematic view of the lock, clamp, and mold portions of FIG. 14a, shown in another condition corresponding to the configuration of the clamp assembly structure shown in FIG. 15;

FIG. 16 is a cross-sectional view of the clamp assembly structure of FIG. 14, shown in another condition;

FIG. 16a is a schematic view of the lock, clamp, and mold portions of FIG. 14a, shown in another condition corresponding to the configuration of the clamp assembly structure shown in FIG. 16;

FIG. 17 is a cross-sectional view of the clamp assembly structure of FIG. 14, shown in another condition;

FIG. 17a is a schematic view of the lock, clamp, and mold portions of FIG. 14a, shown in another condition corresponding to the configuration of the clamp assembly structure shown in FIG. 17;

FIG. 18a is a rear perspective view of a tie bar extension of the clamp assembly structure shown in FIG. 14;

FIG. 18b is a front perspective view of the tie bar extension shown in FIG. 18a;

FIG. 18c is cross sectional view of the tie bar extension shown in FIG. 18a, taken along line 18c-18c of FIG. 18a;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
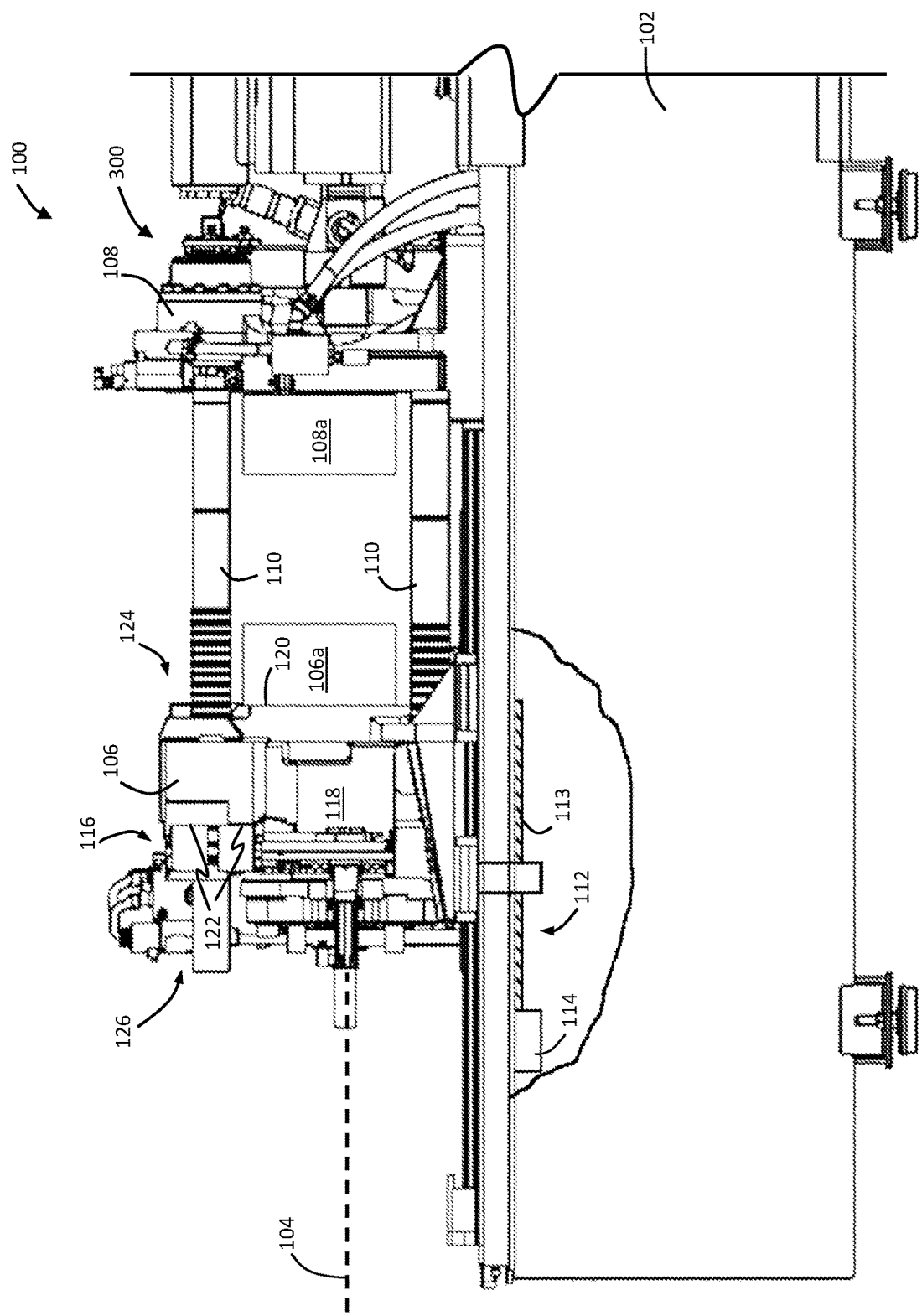
FIG. 1 is a side elevation view of a portion of an injection molding machine.

Referring to FIG. 1, an exemplary injection molding machine 100 includes a machine base 102 that extends lengthwise along a machine axis 104. A pair of platens, including a first platen 106 and a second platen 108, are supported by the machine base 102 for carrying respective mold halves 106a, 108a of a mold. At least one tie bar 110 extends generally between the first and second platens 106, 108 for coupling the platens together and exerting a clamp load across the platens when stretched. In the example illustrated, the machine 100 includes four tie bars 110. Each tie bar 110 extends longitudinally along a respective tie bar axis 132 (FIG. 2).

In the example illustrated, the first platen 106 is also referred to as a moving platen, and the second platen 108 is also referred to as a stationary platen. The first (moving) platen 106 can translate towards and away from the second (stationary) platen 108 along the machine axis 104 to close and open the mold.

A platen actuator 112 can be coupled to the moving platen 106 for advancing and retracting the moving platen 106 between mold-closed and mold-open positions. In the example shown, the platen actuator 112 includes a ball screw 113 driven by an electric motor 114.

Figure 2:
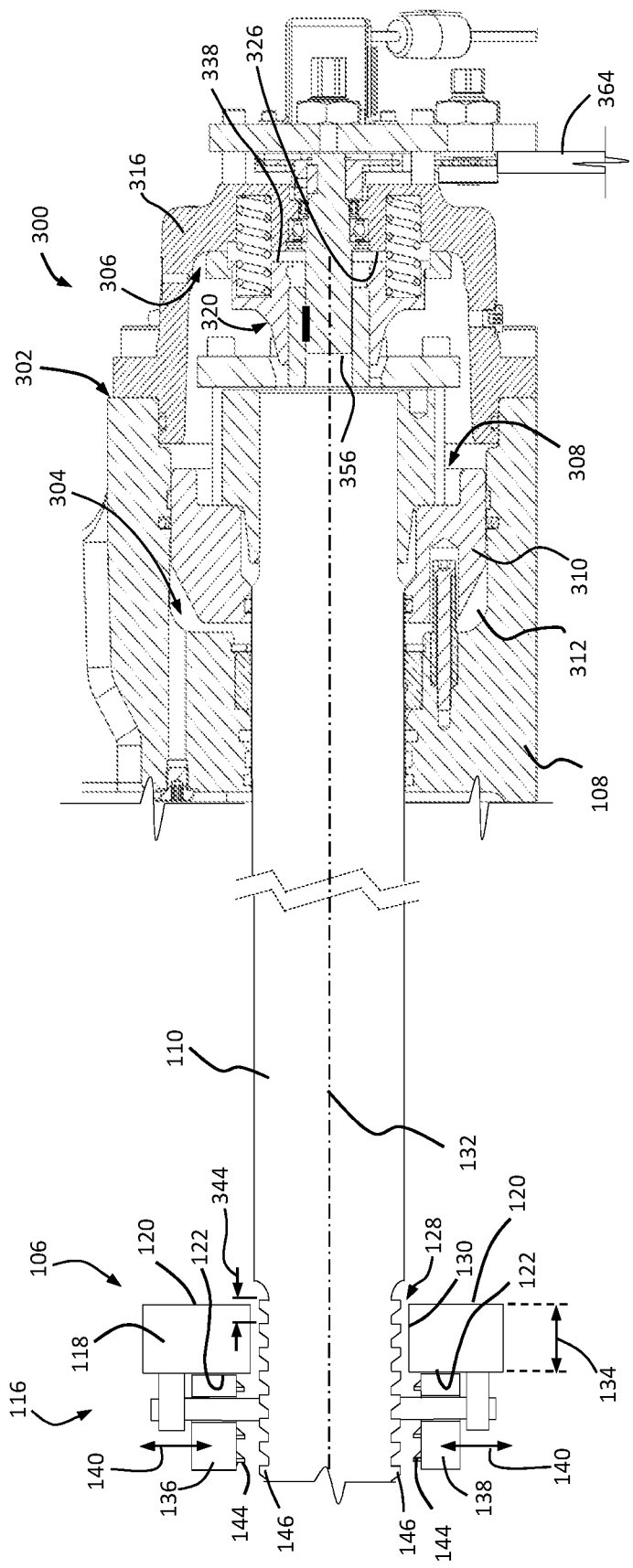
FIG. 2 is an enlarged view of portions of the injection molding machine of FIG. 1, showing a clamp assembly structure (in cross section) and a lock assembly (in schematic), each in a first condition.

Referring to FIG. 2, the machine 100 further includes a lock assembly 116 for releasably coupling the first platen 106 to a respective one of the tie bars 110. In the example illustrated, the machine 100 includes four lock assemblies 116, each mounted to the first platen 106 adjacent a respective tie bar 110.

In the example illustrated, the first platen 106 has a platen body 118 with a mold mounting surface 120 for supporting a mold section on a front side 124 of the first platen 106 facing the second platen 108, and a plurality of platen load bearing surfaces 122 on the back side 126 of the first platen 106, opposite the front side 124. Each lock assembly 116 is mounted to the back side 126 of the first platen 106, proximate the platen load bearing surfaces 122.

In the example illustrated, tie bar bores 128 pass through the platen body 118, in respective corners, for receiving a respective tie bar 110. The bores 128 each extend axially along a respective tie bar axis 132 and are laterally bounded by a bore periphery 130. The platen load bearing surfaces 122 and mold mounting surface 120 are spaced apart from each other by a fixed axial dimension 134 that generally corresponds to an axial thickness of the first platen 106.

Each lock assembly 116 includes, in the example illustrated, first and second lock nut segments 136, 138 translatable in a transverse direction between unlocked (FIG. 2) and locked (FIG. 3) positions for respectively engaging and disengaging the tie bar 110. The transverse direction is generally perpendicular to the tie bar axis 132, and, in the example illustrated, the first and second lock nut segments 136, 138 translate in a vertical direction, as indicated by arrows 140 (FIG. 2), between the locked and unlocked positions. In other examples, the lock assembly 116 may comprise a rotary bayonet style locking device, rotatable between locked and unlocked positions.

Referring to FIG. 3, in the example illustrated, each lock nut segment 136, 138 has an inner, concave tie rod engaging surface 142 directed towards the tie bar 110. The tie rod engaging surface 142 includes lock nut teeth 144. The lock nut teeth 144 protrude inwardly from the tie rod engaging surface 142 towards the tie bar 110. When the lock nut segments 136, 138 are moved to the locked position, the lock nut teeth 144 inter-engage with the tie bar teeth 146 protruding outwardly from the tie bar 110, so that the tie bar 110 and the first platen 106 are coupled together.

The lock nut segments 136, 138 can be translated between the locked and unlocked positions using any suitable actuator or mechanism, including, for example, hydraulic and/or pneumatic pistons, mechanism actuators, or ball screws.

Referring to FIG. 4, in the example illustrated, the machine 100 further includes a clamp assembly 300 for applying a clamp load across the mold halves 106a, 108a when in the mold-closed position. In the example illustrated, the machine 100 has four clamp assemblies 300, each associated with a respective tie bar 110.

Each clamp assembly 300 includes a cylinder housing 302 having an inner end 304 and an outer end 306 spaced axially apart from the inner end 304. In the example illustrated, the cylinder housing 302 is affixed to the second (stationary)

platen 108, and at least a portion of the cylinder housing 302 can be formed within the body of the second platen 108.

Each clamp assembly 300 further includes a clamp piston 308 that includes a piston head 310 affixed by a tie bar nut assembly to a tie bar end portion 111 of the tie bar 110. The clamp piston 308 is slidable within the cylinder housing 302 between a meshing position (FIG. 4) and a clamping position (FIG. 5) spaced axially apart from the meshing position.

In the example illustrated, the meshing position corresponds to a first axial location of the clamp piston 308 for interference-free movement of the lock nut segments 136, 138, between the unlocked (FIG. 2) and locked (FIG. 3) positions relative to the tie bar teeth 146.

Referring to FIG. 5, in the example illustrated, the clamping position corresponds to a second axial location of the clamp piston 308 spaced axially apart from the first axial location in a clamping direction. In the clamping position, a clamp force is exerted via the tie bar 110 across the mold halves 106a, 106b of the machine 100 through engagement of the tie bar teeth 146 with the lock nut teeth 144 (see FIG. 6).

In the example illustrated, a clamp chamber 312 is provided within the cylinder housing 302, axially intermediate the piston head 310 and the inner end 304 of the cylinder housing 302 for holding pressurized fluid and urging the clamp piston 308 toward the outer end 306 of the housing 302 when pressurized. In the example illustrated, the clamp chamber 312 urges the clamp piston 308 from the meshing position to the clamping position when pressurized.

A return device 314 is provided adjacent the outer end 306 of the cylinder housing 302. The return device 314 resiliently bears against the clamp piston 308 during normal machine operation. The return device 314 accommodates movement of the clamp piston 308 from the meshing position towards the outer end 306 of the housing 302 when the clamp chamber is pressurized. In the example illustrated, the return device 314 yields to movement of the clamp piston 308 from the meshing position to the clamping position when the clamp chamber 312 is pressurized, and the return device 314 pushes the clamp piston 308 from the clamping position back to the meshing position when pressure in the clamp chamber 312 is relieved.

In the example illustrated, the return device 314 is contained inside the cylinder housing 302. In the example illustrated, the return device 314 is axially intermediate the piston head 310 and the outer end 306 of the housing. The outer end 306 of the cylinder housing 302 is generally closed off by an end cap 316, and the end cap 316 and the piston head 310 axially enclose an optional leakage collection reservoir 318. In the example illustrated, the return device 314 is disposed within the leakage collection reservoir 318. Oil collected in the leakage reservoir 318 can beneficially lubricate various components of the return device 314.

In the example illustrated, the return device 314 comprises a plunger 320 translatable between plunger advanced (FIG. 4) and plunger retracted (FIG. 5) positions. The plunger advanced position corresponds to the meshing position of the clamp piston 308, and the plunger retracted position corresponds to the clamping position of the clamp piston 308.

The return device 314 further comprises, in the example illustrated, a plurality of springs 322 disposed between the end cap 316 and the plunger 320. When the clamp chamber 312 is pressurized, the clamp piston 308 pushes the plunger 320 towards the plunger retracted position and compresses the springs 322. When pressure in the clamp chamber 312 is relieved, the springs 322 push the plunger 320 away from the outer end 306 of the cylinder housing 302 to the plunger advanced position and the clamp piston 308 to the meshing position.

The return device 314 further includes a return device engagement surface 321 that is movable away from the outer end 306 of the housing 302 to an engagement surface advanced position (FIG. 4) for pushing the clamp piston 308 back to the meshing position when pressure in the clamp chamber 312 is relieved. In the example illustrated, the engagement surface advanced position corresponds to the plunger advanced position. In the example illustrated, the return device engagement surface 321 maintains contact with an axially opposed clamp piston abutment surface 309 fixed relative to the clamp piston 308 when the clamp piston 308 is in, and moves between, the meshing position and the clamping position. In the example illustrated, the return device engagement surface 321 comprises an axial endface of the plunger 320, and the clamp piston abutment surface 309 comprises a tie bar engagement surface of an endface of the tie bar 110.

In the example illustrated, the return device engagement surface 321 resiliently bears against the clamp piston abutment (tie bar engagement) surface 309 when the clamp piston 308 moves between the clamping and meshing positions when applying and relieving a clamp load across the mold halves 106a, 108a. The return device engagement surface 321 is moved towards the outer end 306 of the cylinder housing 302 upon movement of the clamp piston 308 to the clamping position when the clamp chamber 312 is pressurized. When pressure in the clamp chamber 312 is relieved, the return device engagement surface 321 can be moved away (via the springs 322) from the outer end 306 of the cylinder housing 302 to the engagement surface advanced position. During movement to the engagement surface advanced position, the return device engagement surface 1321 can push the clamp piston 308 from the clamping position back to the meshing position.

In the example illustrated, the clamp piston abutment surface 309 bears against the return device engagement surface 321 when the clamp piston 308 moves from the meshing position to the clamping position, and the return device engagement surface 321 bears against the clamp piston abutment surface 309 when the clamp piston 308 moves from the clamping position to the meshing position.

The return device 314 may include a mechanical stop 324 against which the plunger 320 abuts when in the plunger advanced position. Referring to FIG. 5a, in the example illustrated, the mechanical stop 324 comprises a keeper 328 affixed to an interior surface 325 of the cylinder housing 302. The keeper 328 can include an annular body having a stop surface 330 spaced apart from and directed towards the inner end wall 326 of the end cap 316.

The return device 314 further includes, in the example illustrated, a catch surface 334 fixed to the plunger 320. The catch surface 334 is disposed axially between the stop surface 330 and the inner end wall 326 of the end cap 316. In the example illustrated, the catch surface 334 abuts the stop surface 330 when the return device engagement surface 321 is in the engagement surface advanced position (see FIG. 4) to inhibit further axial travel of the return device engagement surface 321 away from the outer end 306 of the housing 302. In the example illustrated, the catch surface 334 abuts the stop surface 330 of the keeper 328 when the return device 314 is in the plunger advanced position. The catch surface 334 is spaced axially apart from the stop surface 330 in the clamping direction when the return device 314 is in the plunger retracted position. In the example illustrated, the plunger 320 includes a plunger collar 346, and the catch surface 334 comprises an endface of a radially outwardly extending portion of the plunger collar 346.

In the example illustrated, the maximum axial travel (i.e. stroke limit) of the plunger 320 is illustrated as distance 340 in FIG. 4. The axial travel of the plunger 320 is limited in the retracted direction by the inner end wall 326 of the end cap 316 (when engaged by a back surface 338 of the plunger 320), and limited in the advanced direction by the mechanical stop 324 (when engaged by the catch surface 334). The stroke limit 340 of the plunger 320 can generally be sized to accommodate stretch of the tie bar 110 during clamp-up and displacement of the tie bar 110 to take-up any tooth clearance 156 (FIG. 3) between the lock nut teeth 144 and the tie bar teeth 146. The stroke limit 340 can also accommodate any lock-nut gap 158 (FIG. 3) provided between the platen load bearing surface 122 of the first platen 106 and a platen-facing abutment surface 148 of the lock nut segments 136, 138. In use, a clearance gap is typically provided between the back surface 338 of the plunger 320 and the end cap 316 of the cylinder housing 302 when full clamp tonnage is applied, and the stroke limit 340 can be sized to further accommodate the clearance gap.

Referring to FIG. 4, in the example illustrated, the axial location of the meshing position is, relative to the cylinder housing 302, infinitely adjustable over an axial adjustment length 342 to accommodate different mold heights (i.e. different axial spacing between the moving and stationary platens 106, 108 when the mold is closed). The axial adjustment length 342 is generally greater than or equal to the tooth spacing 344 (i.e. tooth pitch—see FIG. 2) between adjacent tie bar teeth 146. In some cases the tooth spacing 344 can be in the range of about 5 mm to about 18 mm or more. The axial adjustment length 342 can be in a range of about 0%-75% greater than the tooth spacing 344. In the example illustrated, the tooth spacing 344 is about 12 mm, and the axial adjustment length 342 is about 12 mm.

The infinite adjustment over the length 342 can facilitate setting up the machine 100 so that the meshing position corresponds precisely to a mold-closed position of the platens 106, 108 in which the mold halves 106a, 108a touch each other (i.e. there is zero mold gap). This can help improve cycle time of the machine 100.

In the example illustrated, the plunger 320 of the return device 314 comprises a plunger core 348 coupled to the plunger collar 346. The return device engagement surface 321 can be fixed relative to the plunger core 348. In the example illustrated, the plunger core 348 has an axial endface directed towards the inner end 304 of the cylinder housing, for engagement with the clamp piston abutment surface 309. The axial endface of the plunger core 348 comprises the return device engagement surface 321.

In the example illustrated, the plunger core 348 is adjustable in any one of a plurality of axial adjustment positions relative to the plunger collar 346. Changing the axial location of the plunger core 348 relative to the plunger collar 346—for example, by changing the amount by which the return device engagement surface 321 extends proud of the plunger collar 346—can adjust the axial location of the clamp piston 308 relative to the cylinder housing 302 when in the meshing position, as described subsequently herein.

In the example illustrated, the plunger core 348 is coupled to a rotatable shaft 356. The plunger core 348 is rotationally fixed to the shaft 356 and axially translatable relative to the shaft 356. In the example illustrated, the plunger core 348 is rotationally fixed to the shaft 356 by a key 358 received in corresponding grooves in the shaft 356 and the plunger core 348.

In the example illustrated, the plunger core 348 has a core bore 351 extending axially therethrough. At least a portion of the outer surface of the plunger core 348 is provided with external threads. The plunger collar 346 can include a collar bore 352 extending axially therethrough. The collar bore 352 has an inner surface with complementary internal threads for engaging the external threads of the plunger core 348.

In the example illustrated, to facilitate extension and retraction of the plunger core 348 relative to the plunger collar 346, the collar bore 352 receives the plunger core 348 in threaded engagement. The threaded engagement is configured so that rotation of the plunger core 348 relative to the plunger collar 346 in one direction results in axial extension of the plunger core 348 relative to the plunger collar 346, and rotation of the plunger core 348 relative to the plunger collar 346 in the opposite direction causes axial retraction of the plunger core 348 into the collar bore 352. In the example illustrated, the plunger core 348 is axially fixable relative to the plunger collar 346 in any one of a plurality of axial adjustment positions by rotating the plunger core 348 a selected amount relative to the plunger collar 346.

In the example illustrated, the shaft 356 is rotatably mounted in the end cap 316, and is rotatable about the tie bar axis 132. In the example illustrated, rotation of the shaft 356 causes a corresponding rotation of the plunger core 348, and engagement between the rotating plunger core 348 and the non-rotating plunger collar 346 causes extension and/or retraction of the plunger core 348 within the collar bore 352 and axial translation of the plunger core 348 relative to the shaft 356. By rotating the shaft 356, the axial location of the engagement surface advanced position of the return device engagement surface 321 (i.e. the axial location of the return device engagement surface 321 when the return device 314 is in the plunger advanced position), can be adjusted relative to the cylinder housing 302 to accommodate changes in the axial location of the meshing position in response to changes in mold height. Once the return device engagement surface 321 is in a desired adjustment position, further rotation of the shaft 356 can be inhibited.

In the example illustrated, the shaft 356 is generally coaxial with the plunger core 348, and both the plunger core 348 and the shaft 356 are generally coaxial with the tie bar 110.

The shaft 356 may be rotated using any suitable means, including, for example by hand, using a hand tool (such as a wrench) and by using an actuator. In the example illustrated, an actuator 360 is coupled to the shaft 356. The actuator 360 includes a sprocket 362 mounted to the exposed end of the shaft 356, such that rotation of the sprocket 362 causes corresponding rotation of the shaft 356. The sprocket 362 is driven by a drive belt 364 (or optionally a drive chain or any other suitable mechanism or linkage), which is driven by a suitable motor (e.g. hydraulic or electric) or other drive mechanism.

Optionally, a single drive belt 364, or a combination of two or more drive belts linked together, may be connected to some or all of the sprockets 362 and shafts 356 provided on the platen 108. Providing a drive belt 364 or belt assembly linked to all of the shafts 356 may allow for simultaneous, and preferably synchronized, adjustment of the plunger 320 associated with each tie bar 110. This may also allow for a single motor to be used to drive all of the shafts 356. Using a single motor may reduce cost and machine complexity.

Optionally, a manual actuator, for example a hand crank, may be connected to the shaft 356 in addition to, or as an alternative to the sprocket 362. Providing a hand crank may allow a user to manually rotate the shaft 356. If the drive belt 364 (or similar linkage) is used in combination with the hand crank, a user may simultaneously adjust all four plunger cores 348 by engaging and rotating a single shaft 356. Optionally, the hand crank may be detachable. This may allow the hand crank to be attached when adjustment to the plungers 320 is required, and then detached during normal operation of the machine 100.

Referring to FIG. 7, another example of a clamp assembly 1300 is illustrated. The clamp assembly 1300 has similarities to the clamp assembly 300, and like features are identified by like reference characters, incremented by 1000. Similarly, and with reference to FIG. 7a, the clamp assembly 1300 may be used with an injection molding machine 1100 having similarities to the machine 100, and like features of the machine 1100 are identified by like reference characters of the machine 100, incremented by 1000.

The clamp assembly 1300 is functional to exert a clamp force across the mold halves 1106a, 1108a when the mold halves are in the mold-closed position, and integrally includes provision for mold height adjustment. The clamp assembly 1300 further integrally includes provision for exerting a mold break force to urge the mold halves 1106a, 1108a apart after an injection cycle.

Referring to FIG. 7, each clamp assembly 1300 includes a cylinder housing 1302 having an inner end 1304 and an outer end 1306 spaced axially apart from the inner end 1304. In the example illustrated, the cylinder housing 1302 is affixed to the second (stationary) platen 1108, and at least a portion of the cylinder housing 1302 can be formed within the body of the platen 1108.

Each clamp assembly 1300 further includes a clamp piston 1308 that includes a piston head 1310 affixed by a tie bar nut assembly to a tie bar end portion 1111 of the tie bar 1110 of the machine 1100. The clamp piston 1308 is slidable within the cylinder housing 1302 between a meshing position (FIG. 7) and a clamping position (FIG. 8) spaced axially apart from the meshing position. The clamp piston 1308 may optionally be slidable to a mold break position (FIG. 10). In the example illustrated, the clamp piston 1308 is slidable within the cylinder housing 1302 among the clamping position, the mold break position, and the meshing position, the meshing position disposed axially intermediate the clamping position and the mold break position.

The meshing position corresponds to a first axial location of the clamp piston 1308 for interference-free movement of the lock nut segments 1136, 1138, from the unlocked (FIG. 7b) to the locked (FIG. 7c) positions relative to the tie bar teeth 1146. Optionally, the lock nut segments 1136, 1138 can move from the locked position to the unlocked position while the clamp piston 1308 is in the meshing position.

Referring to FIG. 8, the clamping position corresponds to a second axial location of the clamp piston 1308 spaced axially apart from the first axial location in a clamping direction (i.e. towards the outer end 1306 of the housing 1302, in the example illustrated). In the clamping position, a clamp force is exerted via the tie bar 1110 across the mold (i.e. mold halves 1106a, 1108a) of the machine 1100 through engagement of the tie bar teeth 1146 with the lock nut teeth 1144 (see FIG. 8b).

The mold break position corresponds to a third axial location of the clamp piston 1308 spaced axially apart from the first axial location in an unclamping direction opposite the clamping direction (i.e., towards the inner end 1304 of the housing 1302, in the example illustrated) and in which the mold halves 1106a, 1108a are urged apart by movement of the tie bar 1110 (and hence the moving platen 1106 locked thereto) in the unclamping direction.

Referring back to FIG. 7, in the example illustrated, a clamp chamber 1312 is provided within the cylinder housing 1302 for urging the clamp piston 1308 toward the outer end 1306 of the housing 1302 when pressurized with a working fluid. In the example illustrated, the clamp chamber 1312 urges the clamp piston 1308 from the meshing position to the clamping position when pressurized. The clamp chamber 1312 is axially bounded by opposed surfaces of the piston head 1310 and the inner end 1304 of the cylinder housing 1302. In the example illustrated, the cylinder housing 1302 includes a clamp chamber port 1313 through which the working fluid can be fed into the clamp chamber 1312 from the exterior of the cylinder housing 1302.

A return device 1314 is provided axially intermediate the clamp piston 1308 and the outer end 1306 of the cylinder housing 1302. The return device 1314 resiliently bears against the clamp piston 1308 during machine operation when the clamp piston 1308 moves between the meshing and clamping positions. The return device 1314 accommodates movement of the clamp piston 1308 from the meshing position towards the outer end 1306 of the housing 1302 when the clamp chamber 1312 is pressurized. In the example illustrated, the return device 1314 yields to movement of the clamp piston 1308 from the meshing position to the clamping position when the clamp chamber 1312 is pressurized, and the return device 1314 pushes the clamp piston 1308 from the clamping position back to the meshing position when pressure in the clamp chamber 1312 is relieved.

In the example illustrated, the return device 1314 is contained inside the cylinder housing 1302. In the example illustrated, the return device 1314 is axially intermediate the piston head 1310 and the outer end 1306 of the housing 1302. The outer end 1306 of the cylinder housing 1302 is generally closed off by an end cap 1316. In the example illustrated, the outer end 3306 and the end cap 3316 are fixed relative to the inner end 3304 of the housing 3302. The end cap 1316 and the piston head 1310 axially enclose an optional leakage collection reservoir 1318. In the example illustrated, the return device 1314 is disposed within the leakage collection reservoir 1318. Oil collected in the leakage collection reservoir 1318 can beneficially lubricate various components of the return device 1314.

In the example illustrated, the return device 1314 comprises a plunger 1320 (see also FIG. 9) translatable between plunger advanced (FIG. 7) and plunger retracted (FIG. 8) positions. The plunger advanced position corresponds to the meshing position of the clamp piston 1308, and the plunger retracted position corresponds to the clamping position of the clamp piston 1308.

The return device 1314 further comprises, in the example illustrated, a plurality of springs 1322 disposed between the end cap 1316 and the plunger 1320. When the clamp chamber 1312 is pressurized (FIG. 8), the clamp piston 1308 pushes the plunger 1320 towards the plunger retracted position and compresses the springs 1322. When pressure in the clamp chamber 1312 is relieved (FIG. 7), the springs 1322 push the plunger 1320 away from the outer end 1306 of the cylinder housing 1302 to the plunger advanced position and the clamp piston 1308 to the meshing position.

The return device 1314 further includes a return device engagement surface 1321 that is movable away from the outer end 1306 of the housing 1302 to an engagement surface advanced position (see FIG. 7) for pushing the clamp piston 1308 back to the meshing position when pressure in the clamp chamber 1312 is relieved. In the example illustrated, the engagement surface advanced position corresponds to the plunger advanced position. In the example illustrated, the return device engagement surface 1321 maintains contact with an axially opposed clamp piston abutment surface 1309 fixed relative to the clamp piston 1308 when the clamp piston 1308 moves towards and away from the clamping position when applying and relieving a clamp load across the mold halves 1106*a*, 1108*a*. In the example illustrated, the return device engagement surface 1321 comprises an endface of the plunger 1320, and the clamp piston abutment surface 1309 comprises a tie bar engagement surface on a shoulder of the tie bar 1110.

In the example illustrated, the return device engagement surface 1321 resiliently bears against the clamp piston abutment (tie bar engagement) surface 1309 when the clamp piston 1308 moves between the clamping and meshing positions when applying and relieving a clamp load across the mold halves 1106*a*, 1108*a*. The return device engagement surface 1321 is moved towards the outer end 1306 of the cylinder housing 1302 upon movement of the clamp piston 1308 to the clamping position when the clamp chamber 1312 is pressurized. When pressure in the clamp chamber 1312 is relieved, the return device engagement surface 1321 can be moved away (via the springs 1322) from the outer end 1306 of the cylinder housing 1302 to the engagement surface advanced position. During movement to the engagement surface advanced position, the return device engagement surface 1321 can push the clamp piston 1308 from the clamping position back to the meshing position.

In the example illustrated, the clamp piston abutment surface 1309 bears against the return device engagement surface 1321 when the clamp piston 1308 moves from the meshing position to the clamping position, and the return device engagement surface 1321 bears against the clamp piston abutment surface 1309 when the clamp piston 1308 moves from the clamping position to the meshing position. When the clamp piston 1308 is in the mold break position, the clamp piston abutment surface 1309 can be spaced apart from the return device engagement surface 1321.

The return device 1314 may include a mechanical stop 1324 against which the plunger 1320 abuts when in the plunger advanced position. Referring to FIG. 8, in the example illustrated, the mechanical stop 1324 comprises a keeper 1328 affixed to an interior surface 1325 of the cylinder housing 1302. In the example illustrated, the keeper 1328 includes a stop surface 1330 spaced apart from and directed towards the inner end wall 1326 of the end cap 1316. In the example illustrated, the keeper 1328 comprises an annular body having a radially inner portion 1332 that extends radially inwardly of a pocket 1333 in which the plunger 1320 is slidably seated. The stop surface 1330, in the example illustrated, comprises an underside surface of the radially inner portion 1332 of the keeper 1328.

The return device 1314 further includes, in the example illustrated, a catch surface 1334 fixed to the plunger 1320. The catch surface 1334 is disposed axially between the stop surface 1330 of the keeper 1328 and the inner end wall 1326 of the end cap 1316. In the example illustrated, the catch surface 1334 abuts the stop surface 1330 when the return device engagement surface 1321 is in the engagement surface advanced position to inhibit further axial travel of the return device engagement surface 1321 away from the outer end 1306 of the housing 1302 (see FIG. 7). In the example illustrated, the catch surface 1334 abuts the stop surface 1330 when the return device 1314 is in the plunger advanced position. The catch surface 1334 is spaced axially apart from the stop surface 1330 in the clamping direction when the return device 1314 is in the plunger retracted position. In the example illustrated, the plunger 1320 includes a plunger collar 1346, and the catch surface 1334 comprises an endface of a shoulder extending radially outwardly from, and fixed relative to, the outer surface of the plunger collar 1346 (see also FIG. 9).

Figure 7C:
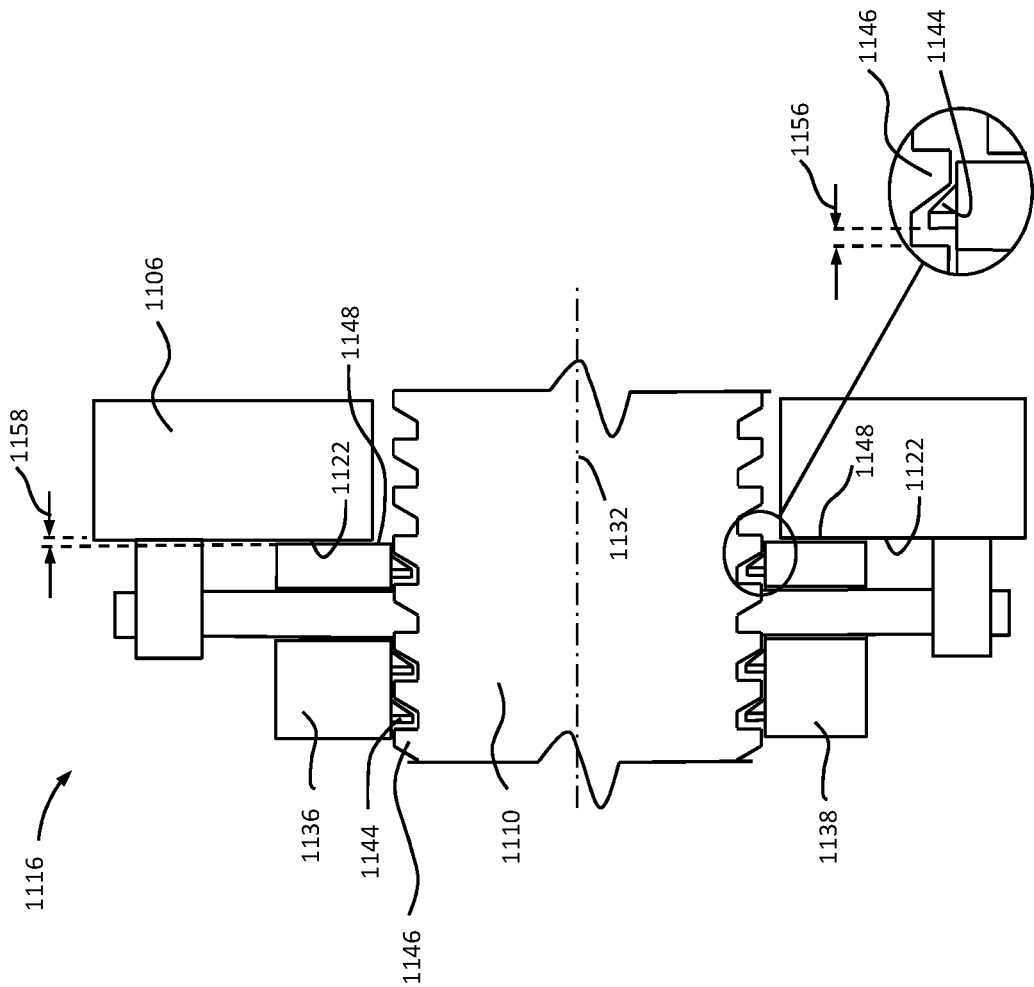
FIG. 7c is a more detailed schematic view of the lock portion of FIG. 7a, shown in the first condition.

In the example illustrated, the maximum axial travel (i.e. stroke limit) of the plunger 1320 is illustrated as distance 1340 in FIG. 7. The axial travel of the plunger 1320 is limited in the retracted direction by the inner end wall 1326 of the end cap 1316 (when engaged by a back surface 1338 of the plunger 1320), and limited in the advanced direction by the stop surface 1330 of the mechanical stop 1324 (when engaged by the catch surface 1334). The stroke limit 1340 of the plunger 1320 can generally be sized to accommodate stretch of the tie bar 1110 during clamp-up and displacement of the tie bar 1110 to take-up any tooth clearance 1156 (FIG. 7*c*) between the lock nut teeth 1144 and the tie bar teeth 1146. The stroke limit 1340 can also accommodate any lock-nut gap 1158 (FIG. 7*c*) provided between the platen load bearing surface 1122 of the first platen 1106 and a platen-facing abutment surface 1148 of the lock nut segments 1136, 1138. In use, a clearance gap is typically provided between the back surface 1338 of the plunger 1320 and the end cap 1316 of the cylinder housing 1302 when full clamp tonnage is applied, and the stroke limit 1340 can be sized to further accommodate the clearance gap.

Referring to FIG. 7, in the example illustrated, the axial location of the meshing position is, relative to the cylinder housing 1302, infinitely adjustable over an axial adjustment length 1342 to accommodate different mold heights. The axial adjustment length 1342 is generally greater than or equal to the tooth spacing 1344 (i.e. tooth pitch—see FIG. 7*b*) between adjacent tie bar teeth 1146. The infinite adjustment can facilitate setting up the machine 1100 so that the meshing position corresponds precisely to a mold-closed position of the platens 1106, 1108 in which the mold halves 1106*a*, 1108*a* touch each other (i.e. there is zero mold gap). This can help improve cycle time of the machine 1100.

In the example illustrated, the plunger 1320 of the return device 1314 comprises a plunger core 1348 coupled to the plunger collar 1346. The return device engagement surface 1321 can be fixed relative to the plunger core 1348. In the example illustrated, the plunger core 1348 has an axial endface directed towards the inner end 1304 of the cylinder housing 1302, for engagement with the clamp piston abutment surface 1309. The axial endface of the plunger core 1348 comprises the return device engagement surface 1321.

The plunger core 1348 is adjustable in any one of a plurality of axial adjustment positions relative to the plunger collar 1346. Changing the axial location of the plunger core 1348 relative to the plunger collar 1346—for example, by changing the amount by which the return device engagement surface 1321 extends proud of the plunger collar 1346—can adjust the axial location of the return device engagement surface 1321 relative to the housing 1302 when the return device 1314 is in the plunger advanced position.

Figure 9:
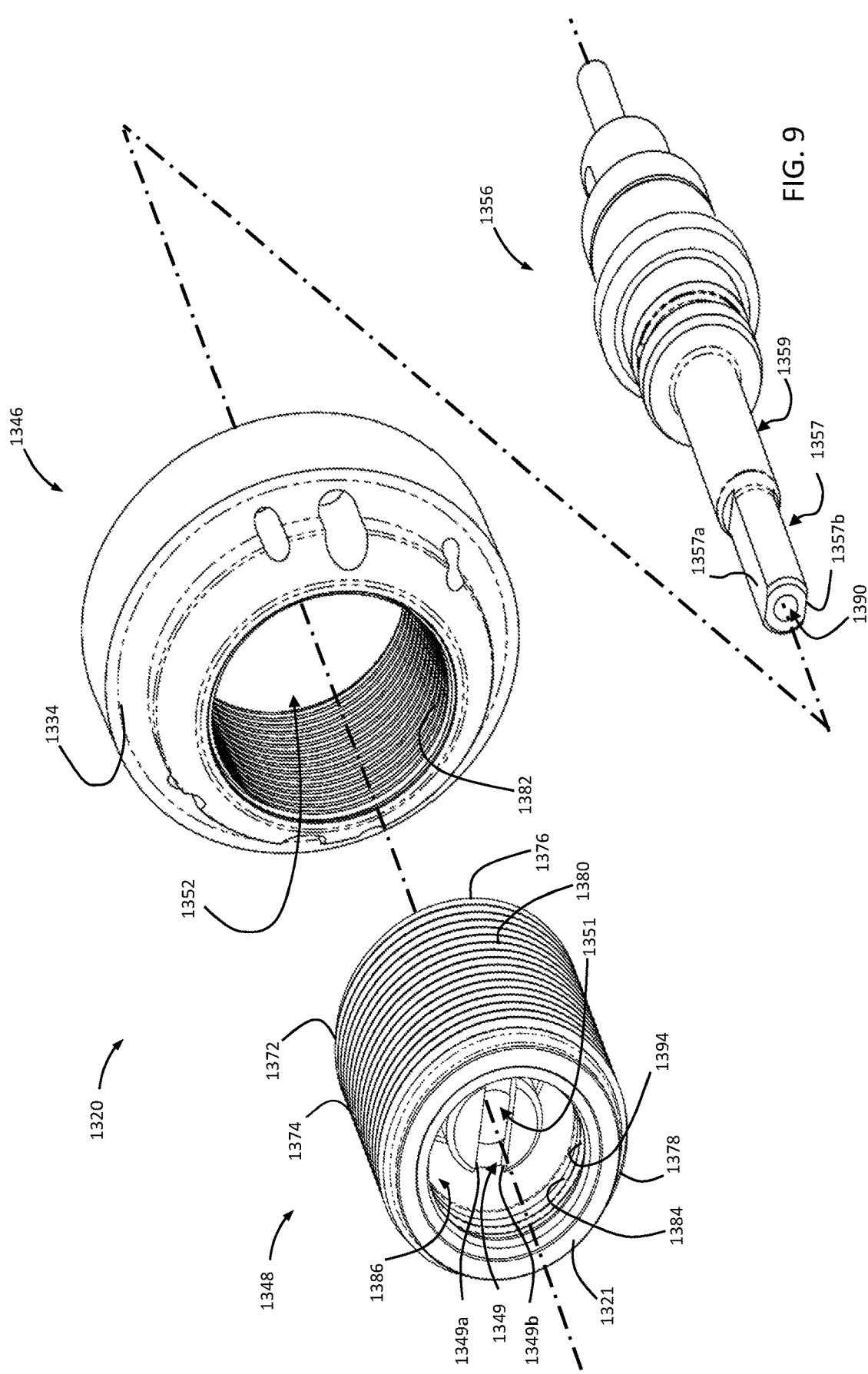
FIG. 9 is an exploded perspective view of a plunger device and a shaft portion of the clamp assembly structure of FIG. 7.

In the example illustrated, the plunger core 1348 is coupled to a rotatable shaft 1356. The plunger core 1348 is rotationally fixed to the shaft 1356 and axially translatable relative to the shaft 1356. Referring to FIG. 9, in the example illustrated, the plunger core 1348 includes a plunger torque transfer surface 1349 fixed to the plunger core 1348. The shaft 1356 includes a complementary shaft torque transfer surface 1357 fixed to the shaft 1356. Engagement of the torque transfer surfaces 1349, 1357 rotationally locks the plunger core 1348 relative to the shaft 1356 and allows axial translation of the plunger core 1348 relative to the shaft 1356 along the torque transfer surfaces 1349, 1357.

In the example illustrated, the plunger core 1348 includes a core bore 1351 extending axially therethrough. The shaft torque transfer surface 1357 comprises diametrically opposed wrench flats 1357a, 1357b, and the plunger torque transfer surface 1349 comprises complementary locking tabs 1349a, 1349b extending radially inwardly of the core bore 1351 to engage the wrench flats 1357a, 1357b.

In the example illustrated, the plunger core 1348 is generally cup-shaped, having a plunger base 1372 and a cylindrical plunger wall 1374 (also referred to as the return device mold break chamber wall 1374) extending between a proximal wall end 1376 joined to an inside surface of the plunger base 1372 and a distal wall end 1378 spaced axially away from the plunger base 1372. In the example illustrated, the plunger wall 1374 of the plunger core 1348 has an inner surface 1384 that defines, at least in part, an interior return device recess 1386 (see also FIG. 11) of the plunger core 1348. The inner surface 1384 of the plunger wall 1374 engages an outer surface 1388 (see FIG. 12) of the tie bar 1110 in sealed, sliding fit.

In the example illustrated, at least a portion of the outer surface of the plunger wall 1374 is provided with external threads 1380. The plunger collar 1346 includes a collar bore 1352 extending axially therethrough. The collar bore 1352 has an inner surface with complementary internal threads 1382 for engaging the external threads 1380 of the plunger core 1348.

In the example illustrated, to facilitate extension and retraction of the plunger core 1348 relative to the plunger collar 1346, the collar bore 1352 receives the plunger core 1348 in threaded engagement. The threaded engagement is configured so that rotation of the plunger core 1348 relative to the plunger collar 1346 in one direction results in axial extension of the plunger core 1348 relative to the plunger collar 1346, and rotation of the plunger core 1348 relative to the plunger collar 1346 in the opposite direction causes axial retraction of the plunger core 1348 into the collar bore 1352. In the example illustrated, the plunger core 1348 is axially fixable relative to the plunger collar 1346 in any one of a plurality of axial adjustment positions by rotating the plunger core 1348 a selected amount relative to the plunger collar 1346.

In the example illustrated, the shaft 1356 is rotatably mounted in the end cap 1316, and is rotatable about the tie bar axis 1132. In the example illustrated, rotation of the shaft 1356 causes corresponding rotation of the plunger core 1348, and engagement between the rotating plunger core 1348 and the non-rotating plunger collar 1346 causes extension and/or retraction of the plunger core 1348 within the collar bore 1352 and axial translation of the plunger core 1348 relative to the shaft 1356. By rotating the shaft 1356, the axial location of the engagement surface advanced position of the return device engagement surface 1321 (i.e. the axial location of the return device engagement surface 1321 when the return device 1314 is in the plunger advanced position), can be adjusted relative to the cylinder housing 1302 to accommodate changes in the axial location of the meshing position in response to changes in mold height. Once the return device engagement surface 1321 is in a desired adjustment position, further rotation of the shaft 1356 can be inhibited. For example, in cases where the shaft 1356 is rotated by a motor, a holding torque can be applied to the motor to prevent further rotation of the shaft 1356.

Figures 11, 11A:
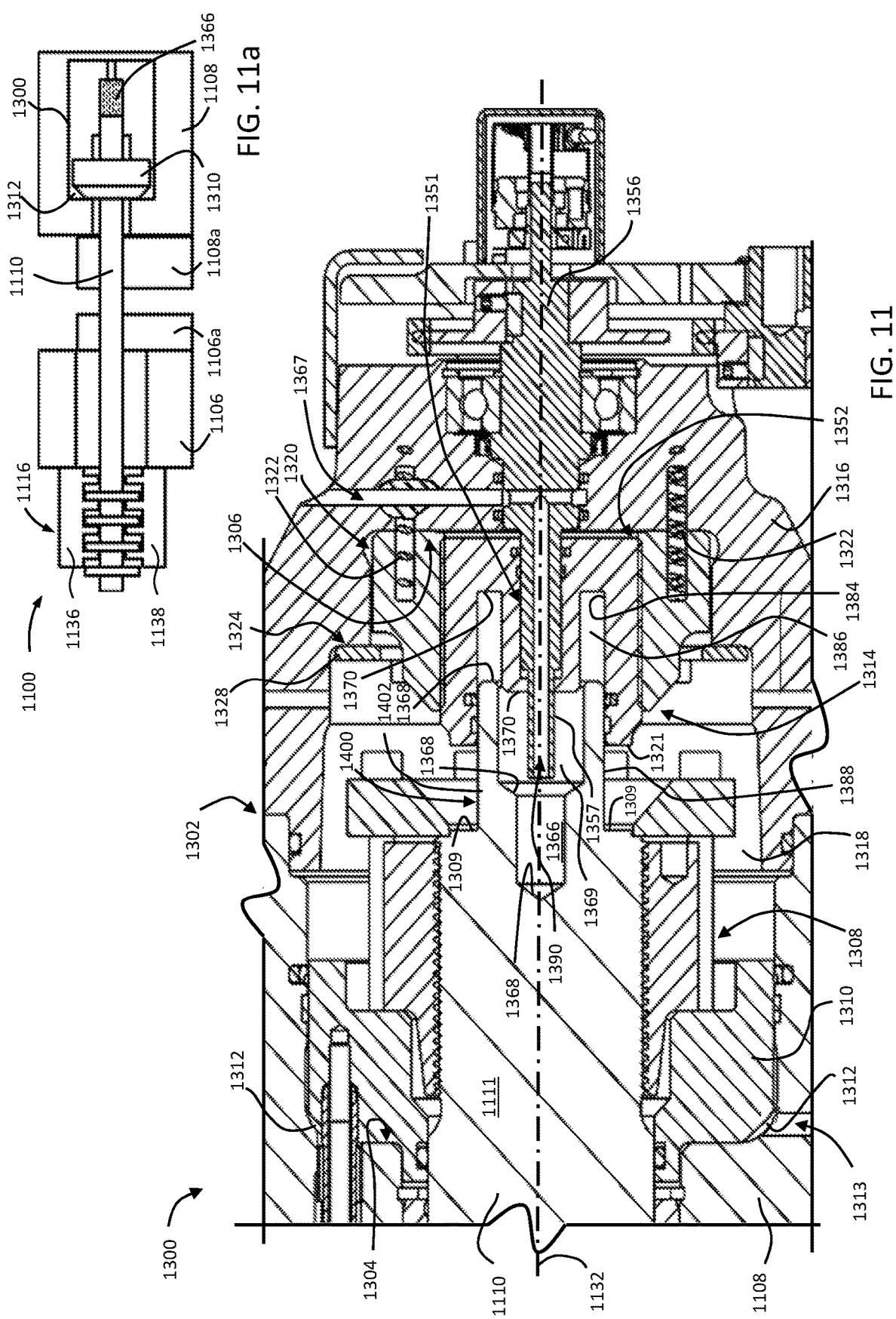
FIG. 11 is a cross-sectional view of the clamp assembly structure of FIG. 7, shown in another condition.
FIG. 11a is a schematic view of the lock, clamp, and mold portions of FIG. 7a, shown in another condition corresponding to the configuration of the clamp assembly structure shown in FIG. 11.

Referring to FIG. 11, in the example illustrated, the clamp assembly 1300 further comprises an optional mold break chamber 1366, for urging the clamp piston 1308 towards the inner end 1304 of the housing 1302 when pressurized. In the example illustrated, the mold break chamber 1366 urges the clamp piston 1308 from the meshing position to the mold break position when pressurized. The mold break chamber 1366 is disposed within the housing 1302, bounded axially by spaced apart mold break surfaces. In the example illustrated, the mold break surfaces comprise a tie bar mold break surface 1368 of the tie bar 1110 and an opposed return device mold break surface 1370 of the return device 1314. In the example illustrated, the tie bar mold break surface 1368 is directed toward the outer end 1306 of the housing 1302, and the return device mold break surface 1370 is directed toward the inner end 1304 of the housing 1302.

In the example illustrated, the mold break chamber 1366 comprises a tie bar cavity 1369 disposed within the tie bar 1110, bounded at least in part by the tie bar mold break surface 1368. The mold break chamber 1366 can additionally or alternatively comprise a recess in the return device 1314 (e.g. the return device recess 1386 of the plunger core 1348), bounded at least in part by a portion of the return device mold break surface 1370. The mold break surfaces 1368, 1370 can be stepped surfaces, each having axially opposed projected areas. The return device 1314 and the tie bar 1110 can inter-engage in sealed sliding fit to enclose the mold break chamber 1366.

In the example illustrated, the tie bar end portion 1111 comprises a tie bar extension 1400 having a tie bar mold break chamber wall 1402 projecting towards the outer end 1306 of the clamp cylinder housing 1302. In the example illustrated, the tie bar mold break chamber wall 1402 extends axially past the tie bar nut assembly fixing the piston head 1310 to the tie bar end portion 1111. The tie bar mold break chamber wall 1402 is generally cylindrical and comprises the tie bar outer surface 1388 engaged by the return device 1314 (i.e. the inner surface 1384 of the return device mold break chamber wall 1374 of the plunger core 1348, in the example illustrated) in sealed sliding fit to enclose the mold break chamber 1366. In the example illustrated, the tie bar mold break surface 1368 comprises a portion of the tie bar extension 1400. A portion of the tie bar cavity 1369 can be disposed within the tie bar extension 1400 of the tie bar 1110. In the example illustrated, the tie bar cavity 1369 extends inwardly of an axial endface of the tie bar extension 1400 to a cavity bottom surface that generally corresponds to a portion of the tie bar mold break surface 1368. At least a portion of the tie bar cavity 1369 is bounded radially by an inner surface of the tie bar mold break chamber wall 1402. In the example illustrated, the tie bar axis 1132 passes through a portion of the mold break chamber 1366 adjacent the cavity bottom surface of the tie bar cavity 1369.

The tie bar extension 1400 can be fixed relative to the tie bar 1110. In the example illustrated, the tie bar end portion 1111 (including the tie bar extension 1400) is of integral, unitary one-piece construction with the tie bar 1110.

In the example illustrated, the core bore 1351 of the plunger core 1348 can provide a passageway for fluid communication between an exterior of the cylinder housing 1302 and the mold break chamber 1366. In the example illustrated, the shaft 1356 passes through the core bore 1351. The shaft has an internal fluid conduit 1390 extending lengthwise of the shaft 1356. The internal fluid conduit 1390 can provide at least a portion of the passageway for fluid communication with the mold break chamber 1366.

The mold break chamber 1366 can be in fluid isolation from the return device engagement surface 1321, and can be in fluid isolation from the piston head 1310. Referring to FIG. 12, in the example illustrated, the shaft 1356 includes a shaft seal portion 1359 extending along a first axial length of the shaft 1356. The shaft seal portion 1359 engages a first seal 1392 fixed within the core bore 1351 of the plunger core 1348, adjacent the proximal wall end 1376 of the plunger core 1348 (see also FIG. 9). In the example illustrated, the plunger core 1348 includes a second seal 1394 fixed to the inner surface 1384 of the plunger wall 1374, adjacent the distal wall end 1378 of the plunger core 1348 (see also FIG. 9). The second seal 1394 engages a tie bar seal portion 1396 extending along the outer surface 1388 of the tie bar mold break chamber wall 1402. Engagement of the shaft seal portion 1359 with the first seal 1392 and the tie bar seal portion 1396 with the second seal 1394 can impede leakage of working fluid from the mold break chamber 1366.

In the example illustrated, the shaft torque transfer surface 1357 extends along a second axial length of the shaft 1356 for engaging the plunger torque transfer surface 1349. In the example illustrated, a portion of the shaft torque transfer surface 1357 is disposed within the mold break chamber 1366.

Referring to FIG. 7, in use, a clamping cycle can begin with the mold closed (mold halves 1106a, 1108a abutting) and the clamp piston 1308 in the meshing position. The clamp chamber 1312 is preferably filled with fluid, but is not subject to clamp pressure. The clamp chamber port 1313 may be closed, and any force that may be exerted on the clamp piston 1308 in the clamping direction by the fluid in the clamp chamber 1312 is less than the force exerted by the springs 1322 in the unclamping direction. Thus, the return device 1314 remains in the plunger advanced position, and the clamp piston abutment surface 1309 (i.e. the tie bar engagement surface, in the example illustrated) remains in abutting engagement against the return device engagement surface 1321. The lock nut segments 1136, 1138 can be moved from the unlocked position (FIG. 7b) to the locked position (FIG. 7c), with the lock nut teeth 1144 advancing between the tie bar teeth 1146 without rubbing against each other, jamming, or otherwise interfering when moving from the unlocked to the locked position.

Referring to FIG. 8, once the lock nut segments 1136, 1138 are in the locked position, the clamp chamber port 1313 can be opened and the clamp chamber 1312 can be pressurized to move the clamp piston 1308 to the clamping position, compressing the springs 1322 in the process. Resin can be injected into the mold when sufficient clamp load has been applied across the mold. In the example illustrated, during movement to the clamping position, the tie bar 1110 and the return device 1314 move in unison, and the volume of the mold break chamber 1366 remains generally constant (i.e. the axially opposed mold break surfaces 1368, 1370 bounding the mold break chamber 1366 remain axially fixed relative to one another during this movement).

Once the injection is complete, the clamp force can be relieved by relieving the pressure in the clamp chamber 1312. The return device 1314 may then push the clamp piston 1308 back to the meshing position, under the force exerted by the springs 1322. In the example illustrated, during movement back to the meshing position, the volume of the clamp chamber 1312 decreases, and the volume of the mold break chamber 1366 continues to remain generally constant (i.e. the axially opposed mold break surfaces 1368, 1370 bounding the mold break chamber 1366 remain axially fixed relative to one another during this movement).

If no mold break force is required, once the clamp piston 1308 has been moved to the meshing position, the lock nut segments 1136, 1138 may be moved to the unlocked position. The platen stroke actuator 1112 (traverse actuator) can then be energized in a reversing direction to open the mold. In some cases, the mold halves 1106a, 1108a, may become frozen together, as a result of, for example, the geometry of the article being molded and/or thermal effects of the injection cycle. In such cases, a strong opening force, greater than that which the traverse actuator 1112 can provide, may be required to break the mold open.

Referring to FIG. 10, in cases where a mold break force is required or desired, before unlocking the lock nut segments 1136, 1138 after an injection cycle, the mold break chamber 1366 may be energized to exert a strong opening force (mold break force) in the unclamping direction. Pressurized fluid can be fed into the mold break chamber 1366 via a mold break port 1367. Feeding pressurized fluid into the mold break chamber 1366 can push the clamp piston 1308 in the unclamping direction, pushing the tie bar 1110 with its tie bar teeth 1146 in the same unclamping direction which, by engagement of the tie bar teeth 1146 with the lock nut teeth 1144 (see FIG. 10b), can push the moving platen 1106 away from the stationary platen 1108 to open the mold.

When first pressurizing the mold break chamber 1366, the force exerted on the return device mold break surface 1370 may move the return device 1314 in the retracted direction towards the outer end 1306 of the cylinder housing 1302. In the example illustrated, the force exerted on the return device mold break surface 1370 moves the return device 1314 against the inner end wall 1326 of the end cap 1316. The force exerted on the tie bar mold break surface 1368 may, prior to exerting a mold opening force on the mold, close a gap between rear faces 1147 of the tie bar teeth 1146 and leading faces 1145 of the lock nut teeth 1144 (see FIG. 10b).

Continued pressurization of the mold break chamber 1366 can urge the clamp piston 1308 (and the tie bar 1110) further away from the clamping position, forcefully pushing the rear faces 1147 of the tie bar teeth 1146 against the leading faces 1145 of the lock nut teeth 1144 (see FIG. 10b). Once the force exerted by the mold break chamber 1366 exceeds the force freezing the mold halves 1106a, 1108a together, the mold half 1108a breaks away from the mold half 1106a, opening a gap 1399 (FIG. 10a) between the mold halves 1106a, 1108a, the gap 1399 associated with further axial movement of the clamp piston 1308 in the unclamping direction, away from the meshing position and into a mold break position.

The mold break chamber 1366 can have a larger volume when the clamp piston 1308 is in a mold break position than when the clamp piston 1308 is in the meshing position. In the example illustrated, when the clamp piston 1308 is in the meshing position and the return device engagement surface 1321 bears against the clamp piston abutment surface 1309, the mold break chamber 1366 has a first volume. The first volume of the mold break chamber 1366 can be defined by a first axial distance between the axially opposed mold break surfaces 1368, 1370 bounding the mold break chamber 1366. In the example illustrated, when the clamp piston 1308 is in a mold break position and the return device engagement surface 1321 is spaced apart from the clamp piston abutment surface 1309, the mold break chamber 1366 has a second volume. The second volume of the mold break chamber 1366 can be defined by a second axial distance between the axially opposed mold break surfaces 1368, 1370 bounding the mold break chamber 1366. In the example illustrated, the second axial distance is greater than the first axial distance, and the second volume is greater than the first volume.

Referring to FIG. 11, the clamp piston 1308 may bottom out in the unclamping direction after the mold halves 1106a, 1108a have been urged apart. In this bottomed-out condition, the clamp chamber 1312 may have a minimum volume, and the mold break chamber 1366 may have a maximum volume. Further introduction of fluid into the mold break chamber 1366 is inhibited.

Referring to FIG. 12, after the mold has been broken open, the pressure in the mold break chamber 1366 can be relieved. The lock nut segments 1136, 1138 can be moved to the unlocked position. In the example illustrated, this can advantageously be done without first moving the tie bar 1110 axially relative to the lock nut segments 1136, 1138 to generate a gap between the tie bar teeth 1146 and the lock nut teeth 1144. In other words, the lock nut segments 1136, 1138 can be moved to the unlocked position without first moving the clamp piston 1308 (and hence the tie bar 1110) to a meshing position.

In the example illustrated, the rear faces 1147 of the tie bar teeth 1146 are negatively inclined, and the leading faces 1145 of the lock nut teeth 1144 are aligned generally parallel to the rear faces 1147 of the tie bar teeth 1146 (see FIG. 10b). As the lock nut segments 1136, 1138 move out of the locked position, there may initially be a small, acceptable amount of rubbing between the tie bar teeth 1146 and the lock nut teeth 1144, but only momentarily when the lock nut teeth 1144 first move out of the locked position. Thereafter a gap can form between the inclined faces 1145, 1147 of the lock nut and tie bar teeth 1144, 1146. Once the lock nut segments 1136, 1138 are unlocked, the traverse actuator 1112 can move the first platen 1106 to the fully open position, and the molded articles can be ejected from the mold.

The clamp piston 1308 can also be moved back to the meshing position, in preparation for initiation of the next clamping cycle. Referring to FIG. 13, in the example illustrated, the clamp chamber 1312 can be pressurized to move the clamp piston 1308 into abutment with the return device 1314. The clamp chamber 1312 can be pressurized sufficiently to "overtravel" the clamp piston 1308 so that the return device 1314 moves into a position against the inner end wall 1326 of the end cap 1316. Movement to this position can provide a hard mechanical stop for the clamp piston 1308. Pressure in the clamp chamber 1312 can then be relieved, allowing the return device 1314 to move to the plunger advanced position (via the springs 1322), pushing the clamp piston into the meshing position.

The above steps can be repeated during successive machine cycles with a first mold having a first mold height that defines a first axial location for the meshing position. After changing the first mold to a second mold having a second mold height that defines a second axial location for the meshing position, the axial location of the engagement surface advanced position of the return device engagement surface 1321 can be adjusted to correspond to the second axial location for the meshing position. Once the axial location of the engagement surface advanced position is adjusted to accommodate the change in mold height, the above steps may be repeated with the second mold.

Referring to FIGS. 14 and 14a, another example of an injection molding machine 2100 and a clamp assembly 2300 is illustrated. The injection molding machine 2100 (with the clamp assembly 2300) has similarities to the injection molding machine 1100 (with the clamp assembly 1300), and like features are identified by like reference characters, incremented by 1000.

The clamp assembly 2300 is functional to exert a clamp force across the mold halves 2106a, 2108a when the mold halves are in the mold-closed position, and integrally includes provision for mold height adjustment. The clamp assembly 2300 further integrally includes provision for exerting a mold break force to urge apart the mold halves 2106a, 2108a after an injection cycle.

The clamp piston 2308 is slidable within the cylinder housing 2302 between a meshing position (FIG. 14) and a clamping position (FIG. 15) spaced axially apart from the meshing position. The clamp piston 2308 may optionally be slidable to a mold break position (FIG. 16). In the example illustrated, the clamp piston 2308 is slidable within the cylinder housing 2302 among the clamping position, the mold break position, and the meshing position, the meshing position disposed axially intermediate the clamping position and the mold break position.

Referring to FIG. 17, in the example illustrated, the tie bar end portion 2111 comprises a tie bar extension 2400 having a tie bar mold break chamber wall 2402 projecting towards the outer end 2306 of the clamp cylinder housing 2302. In the example illustrated, the tie bar mold break chamber wall 2402 extends axially past the tie bar nut assembly fixing the piston head 2310 to the tie bar end portion 2111. The tie bar mold break chamber wall 2402 is generally cylindrical and comprises the tie bar outer surface 2388 engaged by the return device 2314 (i.e. the inner surface 2384 of the return device mold break chamber wall 2374 of the plunger core 2348, in the example illustrated) in sealed sliding fit to enclose the mold break chamber 2366. In the example illustrated, the tie bar extension 2400 is generally constrained to be coaxial with the plunger core 2348 through engagement between the tie bar mold break chamber wall 2402 and the return device mold break chamber wall 2374.

In the example illustrated, the tie bar extension 2400 is formed as a separate component of the tie bar 2110. During operation, the tie bar extension 2400 (and the tie bar mold break chamber wall 2402) may move radially relative to the tie bar 2110. In the example illustrated, the tie bar extension 2400 can move radially relative to the tie bar 2110 so that the axes of the tie bar 2110 and the tie bar extension 2400 are no longer coaxial. Permitting radial movement of the tie bar extension 2400 relative to the tie bar 2110 can facilitate smooth rotation of the plunger core 2348 relative to the plunger collar 2346 by, for example, accommodating misalignment between the axes of the tie bar 2110 and the plunger core 2348. In the example illustrated, regardless of the relative alignment of the tie bar and plunger core axes, the axial location of tie bar extension 2400 can remain generally fixed relative to the tie bar 2110 during normal operation.

In the example illustrated, the tie bar extension 2400 comprises a tie bar extension base 2401 disposed in a tie bar recess 2404 (see also FIG. 19) formed in an endface of the tie bar 2110. Referring to FIG. 18a, in the example illustrated, the tie bar extension base 2401 has a base endface 2408 and a cylindrical base wall 2409 extending from the base endface 2408. Referring to FIG. 18b, in the example illustrated, the tie bar mold break chamber wall 2402 extends from the tie bar extension base 2401 to an axial endface 2414 of the tie bar extension 2400 opposite the base endface 2408. The tie bar extension 2400 may include an optional conical shoulder 2410 extending radially outwardly from the base wall 2409 to the tie bar mold break chamber wall 2402. The conical shoulder 2410 may be provided so that the outer diameter of the base wall 2409 is less than the outer diameter of the tie bar mold break chamber wall 2402, to reduce the cross-sectional area of the tie bar recess 2404. Such reduction in the cross-sectional area of the tie bar recess 2404 can correspond to an increase in the cross-sectional area of the tie bar 2110, which can facilitate accommodating the loads placed on the tie bar 2110.

Referring to FIG. 17, in the example illustrated, the mold break chamber 2366 is bounded axially by the return device mold break surface 2370 of the return device 2314 and the tie bar mold break surface 2368 of the tie bar 2110. In the example illustrated, the tie bar mold break surface 2368 comprises a portion of the tie bar extension 2400. In the example illustrated, the mold break chamber 2366 comprises a tie bar cavity 2369 disposed within the tie bar 2110, bounded at least in part by the tie bar mold break surface 2368. The tie bar cavity 2369 can be disposed within the tie bar extension 2400 of the tie bar 2110. Referring to FIG. 18c, in the example illustrated, the tie bar cavity 2369 extends inwardly of the axial endface 2414 of the tie bar extension 2400 to a cavity bottom surface that generally corresponds to a portion of the tie bar mold break surface 2368. At least a portion of the tie bar cavity 2369 is bounded radially by an inner surface of the tie bar mold break chamber wall 2402. In the example illustrated, the tie bar axis 2132 passes through a portion of the mold break chamber 2366 adjacent the cavity bottom surface of the tie bar cavity 2369.

Referring to FIG. 17, the mold break chamber 2366 can additionally or alternatively comprise a recess in the return device 2314 (e.g. the return device recess 2386 of the plunger core 2348), bounded at least in part by a portion of the return device mold break surface 2370. The mold break surfaces 2368, 2370 can be stepped surfaces, each having axially opposed projected areas.

The mold break chamber 2366 can be in fluid isolation from the return device engagement surface 2321, and can be in fluid isolation from the piston head 2310. Referring to FIG. 15, the shaft seal portion 2359 of the shaft 2356 engages the first seal 2392 of the plunger core 2348. The second seal 2394 of the plunger core 2348 engages a tie bar seal portion 2396. In the example illustrated, the tie bar seal portion 2396 extends along the outer surface 2388 of the tie bar mold break chamber wall 2402. Engagement of the shaft seal portion 2359 with the first seal 2392 and the tie bar seal portion 2396 with the second seal 2394 can impede leakage of working fluid from the mold break chamber 2366.

Figure 19:
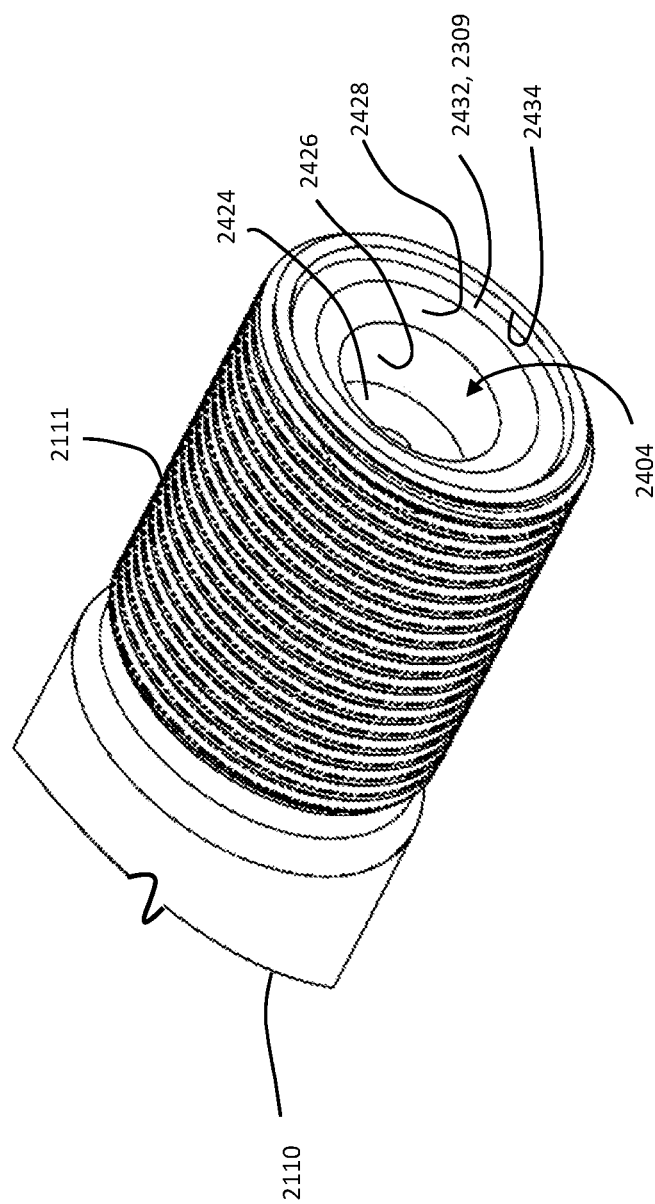
FIG. 19 is a perspective view of a tie bar portion of the clamp assembly structure shown in FIG. 14.

Referring to FIG. 19, in the example illustrated, the tie bar recess 2404 comprises a tie bar bore defined by a bore inner endface 2424 and a generally cylindrical bore inner surface 2426 extending from the bore inner endface 2424. The tie bar recess 2404 may further comprise a tie bar counter-bore defined by a counter-bore inner endface 2432 and a generally cylindrical counter-bore inner surface 2434 extending from the counter-bore inner endface 2432 to the endface of the tie bar 2110. In the example illustrated, the clamp piston abutment surface 2309 (i.e. the tie bar engagement surface, in the example illustrated) comprises the counter-bore inner endface 2432 of the tie bar recess 2404. The tie bar recess 2404 may further include an optional chamfered surface 2428 extending between the bore inner surface 2426 and the counter-bore inner endface 2432. The chamfered surface 2428 of the tie bar recess 2404 and the conical shoulder 2410 of the tie bar extension 2400 may be generally parallel spaced apart surfaces.

Figure 14B:
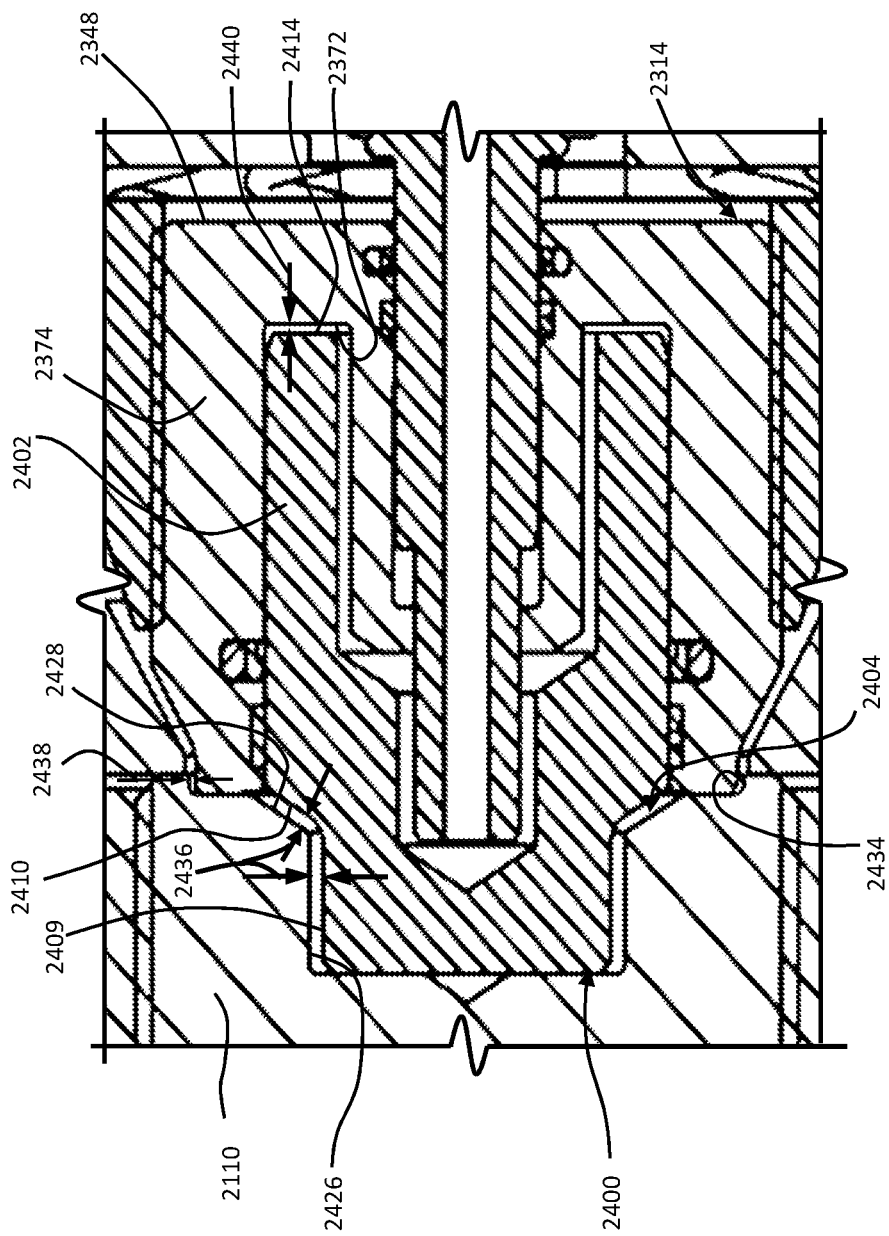
FIG. 14b is an enlarged view of a portion of the clamp assembly structure of claim 14.

In some examples, a portion of the tie bar extension 2400 may be disposed within the bore of the recess 2404 and/or a portion of the plunger core 2348 may be disposed within the counter-bore of the recess 2404 when the clamp piston 2308 is in the meshing position. In such examples a radial clearance gap can be provided about the outer periphery of such portions of the tie bar extension 2400 and/or the plunger core 2348. Referring to FIG. 14b, in the example illustrated, the radial clearance gap can comprise a first radial clearance gap 2436 provided between the inner surface of the tie bar recess 2404 and the outer surface of the tie bar extension 2400. In the example illustrated, the first radial clearance gap 2436 comprises an annular gap extending between the base wall 2409 of the tie bar extension 2400 and the bore inner surface 2426 of the tie bar recess 2404, and between the conical shoulder 2410 of the tie bar extension 2400 and the chamfered surface 2428 of the tie bar recess 2404. Providing the first radial clearance gap 2436 may accommodate radial movement and radial misalignment of the tie bar extension 2400 (and the tie bar mold break chamber wall 2402) relative to the tie bar 2110.

In the example illustrated, the radial clearance gap can further comprise a second radial clearance gap 2438 provided between the inner surface of the tie bar recess 2404 and the outer surface of the return device mold break chamber wall 2374. In the example illustrated, the second radial clearance gap 2438 comprises an annular gap extending between the counter-bore inner surface 2434 and the outer surface of the return device mold break chamber wall 2374. Providing the second radial clearance gap 2438 may accommodate radial movement and radial misalignment of the plunger core 2348 (and the return device mold break chamber wall 2374) relative to the tie bar 2110.

During movement of the clamp piston 2308 between the meshing and clamping positions, an axial clearance gap 2440 may be maintained between the inner surfaces of the return device 2314 and the tie bar extension 2400. In the example illustrated, the axial clearance gap 2440 is maintained between the axial endface 2414 of the tie bar extension 2400 and the inner surface of the base 2372 of the plunger core 2348 to inhibit these surfaces from abutting. Maintaining the axial clearance gap 2440 can help maintain desired contact between the clamp piston abutment surface 2309 and the return device engagement surface 2321 when the clamp piston 2308 is in the meshing or clamping position. In the example illustrated, when the clamp piston 2308 is in the mold break position, the axial clearance gap 2440 increases.

Referring to FIG. 14, in use, a clamping cycle can begin with the mold closed (i.e., mold halves 2106a, 2108a abutting) and the clamp piston 2308 in the meshing position. Referring to FIG. 15, once the lock nut assembly 2116 is in the locked position, the clamp chamber 2312 can be pressurized to move the clamp piston 2308 from the meshing position to the clamping position. Resin can be injected into the mold when sufficient clamp load has been applied across the mold halves 2106a, 2108a. Once the injection is complete, the clamp load can be relieved by relieving the pressure in the clamp chamber 2312. When pressure in the clamp chamber 2312 is relieved, the force exerted by the springs 2322 pushes the clamp piston 2308 (via the return device 2314) from the clamping position into the meshing position.

Referring to FIG. 16, in cases where a mold break force is required or desired, before unlocking the lock assembly 2116 after an injection cycle, pressurized working fluid can be fed into the mold break chamber 2366. The pressurized working fluid can push the mold break surfaces 2368, 2370 axially apart, moving the tie bar mold break surface 2368 in the unclamping direction toward the inner end 2304 of the cylinder housing 2302.

When first pressurizing the mold break chamber 2366, the force exerted on the return device mold break surface 2370 may move the return device 2314 in the retracted direction towards the outer end 2306 of the cylinder housing 2302. In the example illustrated, this force (exerted on the return device mold break surface 2370) moves the return device 2314 against the inner end wall 2326 of the end cap 2316. Continued pressurization of the mold break chamber 2366 can then push the tie bar mold break surface 2368 in the unclamping direction toward the inner end 2304 of the cylinder housing 2302. In the example illustrated, the force pushing the tie bar mold break surface 2368 in the unclamping direction can be transferred to the tie bar 2110 via the tie bar extension 2400 bearing against the bore inner endface 2424 of the tie bar recess 2404. This force in the unclamping direction can then be transferred to the moving platen 2106 from the tie bar 2110, via the engaged teeth of the lock nut assembly 2116.

Once the force exerted by the mold break chamber 2366 exceeds the force freezing the mold halves 2106a, 2108a together, the mold half 2108a breaks away from the mold half 2106a, opening a gap 2399 (FIG. 16a) between the mold halves 2106a, 2108a, the gap 2399 associated with further axial movement of the clamp piston 2308 in the unclamping direction, away from the meshing position and into a mold break position.

Referring to FIG. 17, the clamp piston 2308 may bottom out in the unclamping direction after the mold halves 2106a, 2108a have been urged apart. After the mold halves 2106a, 2108a have been urged apart, the pressure in the mold break chamber 2366 can be relieved. The lock nut assembly 2116 can be moved into the unlocked position, and the clamp piston 2308 can be moved back to the meshing position, in preparation for initiation of the next clamping cycle.

Figure 20:
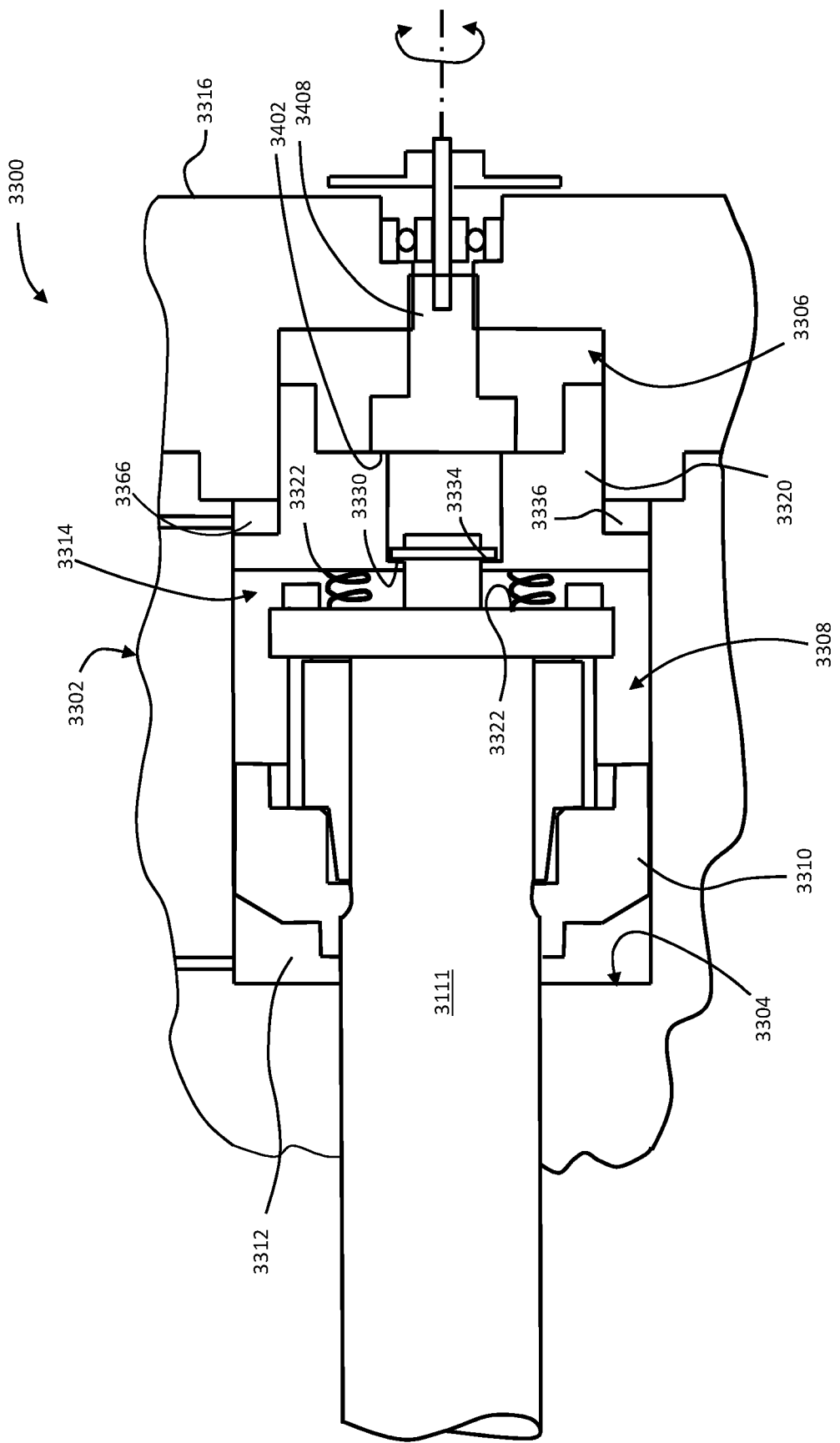
FIG. 20 is a cross-sectional view of another alternate clamp assembly structure for use with an injection molding machine, shown in a first condition.
Figure 21:
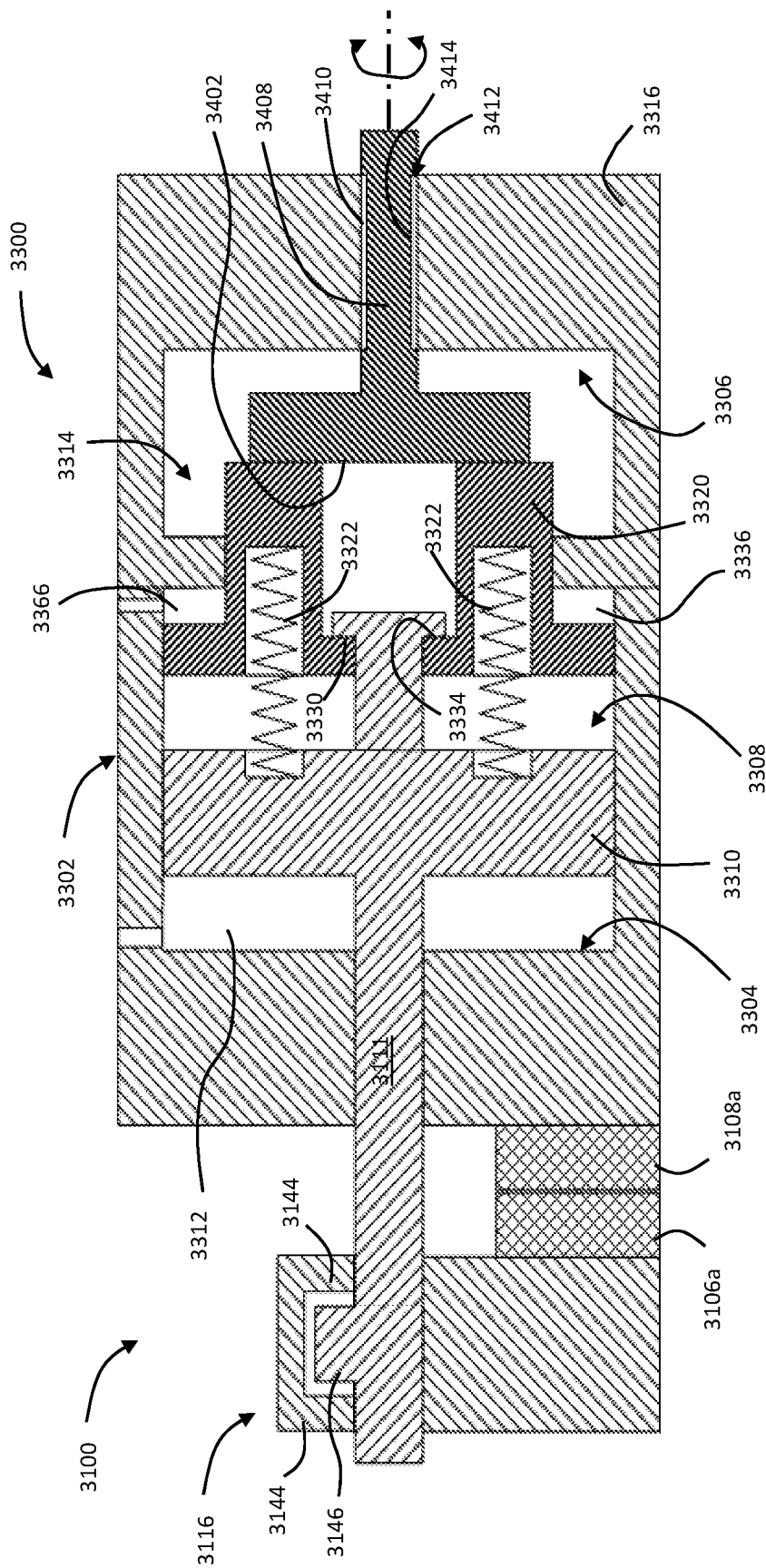
FIG. 21 is a schematic view of the clamp assembly structure of FIG. 20 and lock and mold portions of the injection molding machine, shown in the first condition.

Referring to FIGS. 20 and 21, another example of an injection molding machine 3100 and a clamp assembly 3300 is illustrated. The injection molding machine 3100 (with the clamp assembly 3300) has similarities to the injection molding machine 1100 (with the clamp assembly 1300), and like features are identified by like reference characters, incremented by 2000.

The clamp assembly 3300 is functional to exert a clamp force across the mold halves 3106a, 3108a when the mold halves are in the mold-closed position, and integrally includes provision for mold height adjustment. The clamp assembly 3300 further integrally includes provision for exerting a mold break force to urge apart the mold halves 3106a, 3108a after an injection cycle.

Referring to FIG. 21, each clamp assembly 3300 includes a cylinder housing 3302 having an inner end 3304 and an outer end 3306 spaced axially apart from the inner end 3304. The outer end 3306 of the cylinder housing 3302 is generally closed off by an end cap 3316.

Each clamp assembly 3300 further includes a clamp piston 3308 that includes a piston head 3310 affixed to a tie bar end portion 3111 of the tie bar 3110. The clamp piston 3308 is slidable within the cylinder housing 3302 between a meshing position (FIG. 21) and a clamping position (FIG. 22) spaced axially apart from the meshing position. The clamp piston 3308 may optionally be slidable to a mold break position (FIG. 23). In the example illustrated, the clamp piston 3308 is slidable within the cylinder housing 3302 among the clamping position, the mold break position, and the meshing position, the meshing position disposed axially intermediate the clamping position and the mold break position.

Referring back to FIG. 21, in the example illustrated, a clamp chamber 3312 is provided within the cylinder housing 3302 for urging the clamp piston 3308 towards the outer end 3306 of the housing 3302 when pressurized with a working fluid. In the example illustrated, the clamp chamber 3308 urges the clamp piston 3308 from the meshing position to the clamping position when pressurized. The clamp chamber 3312 is axially intermediate the piston head 3310 and the inner end 3304 of the housing 3302.

The clamp assembly 3300 further comprises a return device 3314 within the housing 3302. In the example illustrated, the return device 3314 is axially intermediate the piston head 3310 and the outer end 3306 of the housing 3302. In the example illustrated, the return device 3314 accommodates movement of the clamp piston 3308 from the meshing position towards the outer end 3306 of the housing 3302 when the clamp chamber 3312 is pressurized. In the example illustrated, the return device 3314 yields to movement of the clamp piston 3308 from the meshing position to the clamping position when the clamp chamber 3312 is pressurized, and can push the clamp piston 3308 from the clamping position back to the meshing position when pressure in the clamp chamber 3312 is relieved.

Referring to FIG. 21, in the example illustrated, the return device 3314 includes a return device engagement surface 3321 movable away from the outer end 3306 of the housing 3302 to an engagement surface advanced position (shown in FIG. 21) for pushing the clamp piston 3308 back to the meshing position when pressure in the clamp chamber 3312 is relieved. In the example illustrated, the return device engagement surface 3321 resiliently bears against the clamp piston 3308 when pushing the clamp piston 3308 back to the meshing position. In the example illustrated, the return device engagement surface 3321 resiliently bears against the clamp piston 3308 during movement of the clamp piston 3308 between the meshing and clamping positions when applying and relieving a clamp load across the mold halves 3106a, 3108a.

Referring to FIG. 23, in the example illustrated, the clamp assembly 3300 further comprises an optional mold break chamber 3366, for urging the clamp piston 3308 from the meshing position toward the inner end 3304 of the housing 3302 when pressurized. In the example illustrated, the mold break chamber 3366 urges the clamp piston to the mold break position when pressurized.

In the example illustrated, the mold break chamber 3366 is disposed within the housing 3302. The mold break chamber 3366 is bounded axially by spaced apart mold break surfaces. In the example illustrated, the mold break surfaces comprise a housing mold break surface 3371 fixed relative to the housing 3302, and an opposed return device mold break surface 3370 of the return device 3314. In the example illustrated, the housing mold break surface 3371 is directed towards the inner end 3304 of the housing 3302, and the return device mold break surface 3370 is directed towards the outer end 3306 of the housing 3302.

In the example illustrated, the mold break chamber 3366 has a larger volume when the clamp piston 3308 is in the mold break position (FIG. 23) than when the clamp piston 3308 is in the meshing position (FIG. 21). The mold break chamber 3366 has a volume that remains generally constant when the clamp piston moves from the meshing position (FIG. 21) toward the outer end of the housing (see FIG. 22). The mold break chamber 3366 can be in fluid isolation from the return device engagement surface 3321, and can be in fluid isolation from the piston head 3310.

In the example illustrated, the return device 3314 comprises a plunger 3320 movable within the housing 3302 and relative to the clamp piston 3308. The return device mold break surface 3370 is fixed to the plunger 3320. The mold break chamber 3366 urges the plunger 3320 towards the inner end 3304 of the housing 3302 when pressurized for pushing the clamp piston 3308 from the meshing position towards the inner end 3304 of the housing 3302 (and to the mold break position).

In the example illustrated, the return device engagement surface 3321 is coupled to the plunger 3320, and pushes the clamp piston 3308 axially apart from the plunger 3320. In the example illustrated, the return device 3314 comprises a plurality of springs 3322 axially captive between the clamp piston 3308 and the plunger 3320. The springs 3322 push the return device engagement surface 3321 against the clamp piston 3308, and urge the clamp piston 3308 and the plunger 3320 axially apart. In the example illustrated, each spring 3322 has a spring axial end face directed towards the inner end 3304 of the housing 3302 and resiliently bearing against the clamp piston 3308. The return device engagement surface 3321 comprises the spring axial end faces of the springs 3322, in the example illustrated.

Figure 22:
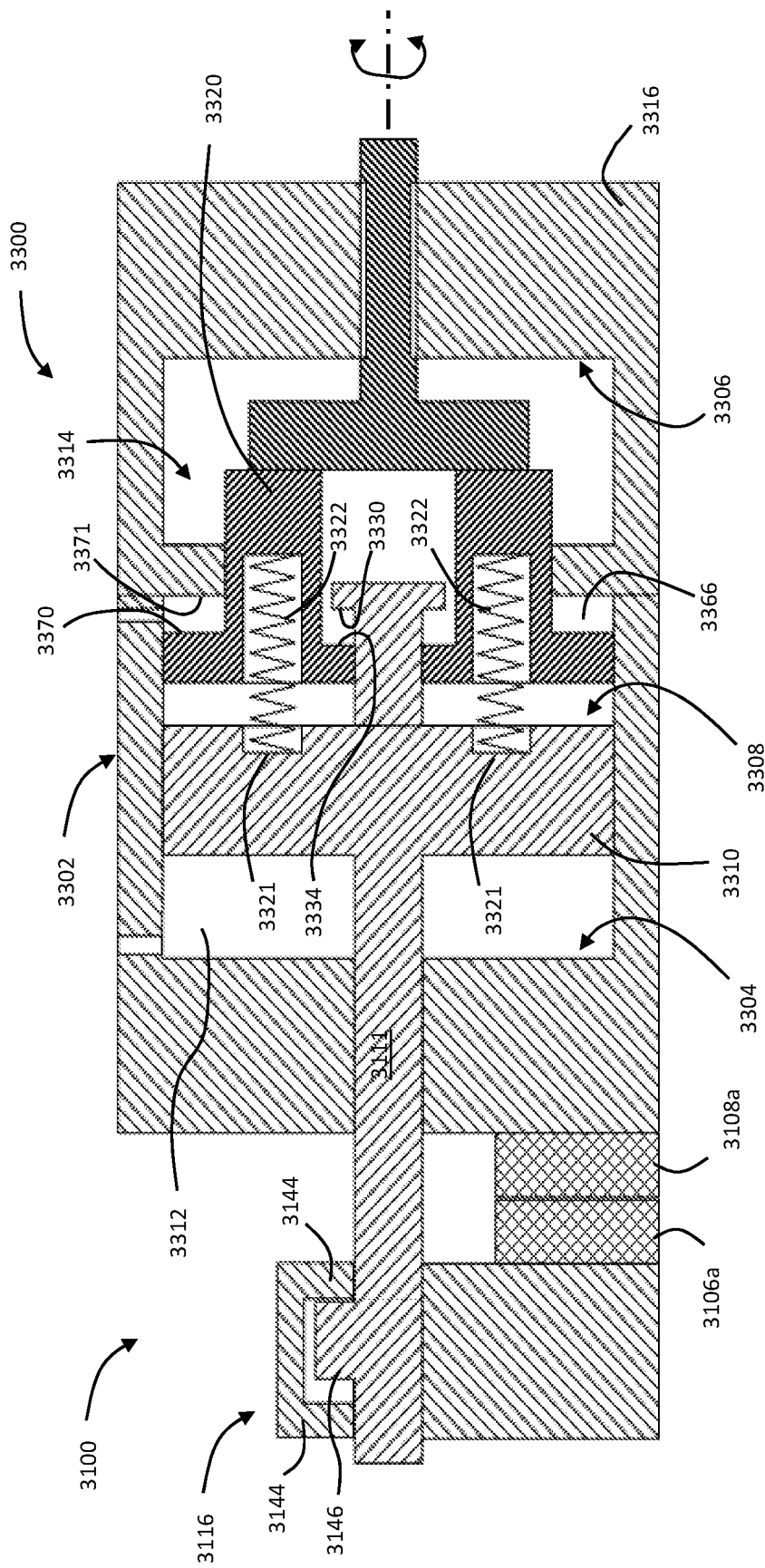
FIG. 22 is a schematic view of the clamp assembly structure of FIG. 20 and lock and mold portions of the injection molding machine, shown in another condition.
Figure 23:
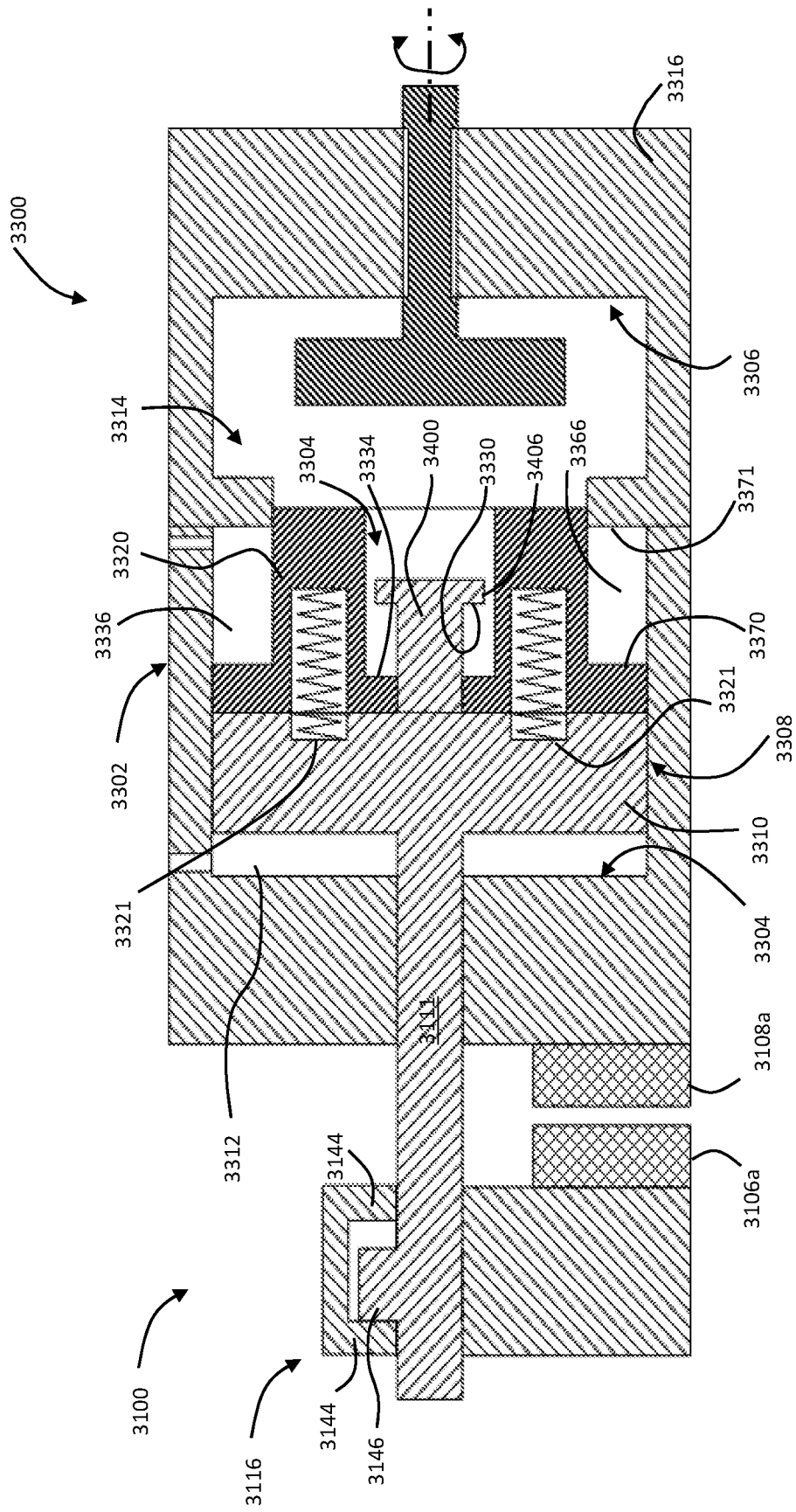
FIG. 23 is a schematic view of the clamp assembly structure of FIG. 20 and lock and mold portions of the injection molding machine, shown in another condition.

In the example illustrated, movement of the clamp piston 3308 from the meshing position toward the outer end 3306 of the housing 3302 when the clamp chamber 3312 is pressurized compresses the springs 3322 (see FIG. 22). When pressure in the clamp chamber 3312 is relieved, the springs 3322 push the clamp piston 3308 away from the outer end 3306 of the housing 3302 and back to the meshing position (see FIG. 21).

Referring to FIG. 22, in the example illustrated, the clamp assembly 3300 further includes a stop surface 3330 within the housing 3302 for engagement by a catch surface 3334 fixed to the return device 3314. The catch surface 3334 engages the stop surface 3330 when the return device engagement surface 3321 is in the engagement surface advanced position (see FIG. 21) to inhibit further axial travel of the return device engagement surface 3321 away from the outer end 3306 of the housing 3302. In the example illustrated, the catch surface 3334 engages the stop surface 3330 to limit axial travel of the return device engagement surface 3321 away from the plunger 3320. In the example illustrated, the catch surface 3334 engages the stop surface 3330 when the clamp piston 3308 is in the meshing position (see FIG. 21). The catch surface 3334 is spaced axially apart from the stop surface 3330 when the clamp piston 3308 is in the clamping position (see FIG. 22). In the example illustrated, the stop surface 3330 is fixed relative to the clamp piston 3308, and is directed towards the inner end 3304 of the housing 3302. The catch surface is fixed relative to the plunger 3320, and is directed towards the outer end 3306 of the housing 3302.

Referring to FIG. 23, in the example illustrated, the clamp assembly 3300 includes a plunger bore 3404 extending axially through the plunger 3320. The plunger bore 3404 includes a plunger bore step surface directed towards the outer end 3306 of the housing 3302. The catch surface 3334 comprises the plunger bore step surface in the example illustrated. In the example illustrated, the tie bar 3110 comprises a tie bar extension 3400 extending through the plunger bore 3404 towards the outer end 3306 of the housing 3302. The tie bar extension 3400 includes a radially outwardly extending flange 3406 axially intermediate the catch surface 3334 and the outer end 3306 of the housing 3302.

The flange 3406 includes a flange axial endface directed towards the inner end 3304 of the housing 3302. The stop surface 3330 comprises the flange axial endface, in the example illustrated.

Referring to FIG. 21, in the example illustrated, the axial location of the engagement surface advanced position of the return device engagement surface 3321 is infinitely adjustable relative to the housing 3302 over an axial adjustment length, for accommodating changes in the axial location of the meshing position in response to changes in mold height. The axial adjustment length is generally greater than or equal to the tooth spacing between adjacent tie bar teeth 3146.

In the example illustrated, the return device 3314 further comprises a return device adjustment surface 3402 axially fixable relative to the housing 3302. In the example illustrated the return device adjustment surface 3402 is disposed axially intermediate the plunger 3320 and the outer end 3306 of the housing 3302. The plunger 3320 abuts the return device adjustment surface 3402 during movement of the clamp piston 3308 from the meshing position toward the outer end 3306 of the housing 3302 when the clamp chamber 3312 is pressurized, and during movement of the return device engagement surface 3321 away from the outer end 3306 of the housing 3302 to the engagement surface advanced position when pressure in the clamp chamber 3312 is relieved.

In the example illustrated, the return device 3314 can be coupled to an adjustment actuator, and rotation of the adjustment actuator can adjust the axial location of the engagement surface advanced position relative to the housing 3302 over the axial adjustment length.

In the example illustrated, the return device adjustment surface 3402 is affixed to a rotatable adjustment surface shaft 3408. In the example illustrated, at least a portion of the outer surface of the adjustment surface shaft 3408 is provided with external threads 3410. The end cap 3316 includes an end cap bore 3412 extending axially therethrough. The end cap bore 3412 has an inner surface with complementary internal threads 3414 for engaging the external threads 3410 of the adjustment surface shaft 3408 to facilitate extension and retraction of the return device adjustment surface 3321 relative to the end cap 3316. In the example illustrated, the return device adjustment surface 3402 is axially fixable relative to the housing 3302 in any one of a plurality of axial adjustment locations by rotating the adjustment surface shaft 3408 a selected amount relative to the housing 3302.

In the example illustrated, once the return device adjustment surface 3402 is suitably adjusted to accommodate a change in mold height, further rotation of the adjustment surface shaft 3408 can be inhibited. For example, in cases where the adjustment surface shaft 3408 is rotated by an actuator such as a motor, a holding torque can be applied to the motor to prevent further rotation of the adjustment surface shaft 3408 relative to the housing 3302.

While the above description provides examples of one or more processes or apparatuses, it will be appreciated that other processes or apparatuses may be within the scope of the accompanying claims.

The invention claimed is:

1. A clamp assembly for an injection molding machine, comprising:
 a) a clamp cylinder housing having an inner end and an outer end spaced axially apart from the inner end;
 b) a clamp piston comprising a piston head affixed to an end portion of a tie bar, the clamp piston slidable within the housing among a clamping position, a mold break position, and a meshing position disposed axially intermediate the clamping position and the mold break position;

c) a clamp chamber axially bounded by opposed surfaces of the piston head and the inner end of the cylinder housing for urging the clamp piston towards the clamping position when pressurized;

d) a return device axially intermediate the clamp piston and the outer end of the cylinder housing, the return device including a return device engagement surface resiliently bearing against a clamp piston abutment surface fixed relative to the clamp piston when the clamp piston moves between the meshing position and the clamping position, the return device engagement surface moving towards the outer end of the housing upon movement of the clamp piston to the clamping position when the clamp chamber is pressurized, and the return device engagement surface movable away from the outer end of the housing to an engagement surface advanced position for pushing the clamp piston from the clamping position back to the meshing position when pressure in the clamp chamber is relieved; and e) a mold break chamber bounded axially by a tie bar mold break surface of the tie bar and an opposed return device mold break surface of the return device, for urging the clamp piston to the mold break position when pressurized.

2. The clamp assembly of claim 1, wherein the mold break chamber is in fluid isolation from the piston head, and the mold break chamber is in fluid isolation from the return device engagement surface.

3. The clamp assembly of claim 1, wherein the clamp piston abutment surface bears against the return device engagement surface when the clamp piston moves from the meshing position to the clamping position, and wherein the return device engagement surface bears against the clamp piston abutment surface when the clamp piston moves from the clamping position to the meshing position.

4. The clamp assembly of claim 1, wherein the clamp piston abutment surface is spaced apart from the return device engagement surface when the clamp piston is in the mold break position.

5. The clamp assembly of claim 1, wherein the return device and the tie bar inter-engage in sealed sliding fit to enclose the mold break chamber.

6. The clamp assembly of claim 1, wherein the mold break chamber has a larger volume when the clamp piston is in the mold break position than when the clamp piston is in the meshing position, and wherein the mold break chamber has a volume that remains generally constant when the clamp piston moves between the meshing and clamping positions.

7. The clamp assembly of claim 1, wherein the mold break chamber comprises a tie bar cavity in the tie bar and a return device recess in the return device.

8. The clamp assembly of claim 1, wherein the axial location of the engagement surface advanced position is infinitely adjustable relative to the housing over an axial adjustment length for accommodating changes in the axial location of the meshing position in response to changes in mold height.

9. The clamp assembly of claim 8, wherein when the return device engagement surface is in the engagement surface advanced position, a catch surface fixed to the return device abuts a stop surface fixed to the housing to inhibit further axial movement of the return device engagement surface away from the outer end of the housing.

10. The clamp assembly of claim 9, wherein the return device comprises a plunger core having an externally threaded outer surface and a plunger collar having an internally threaded collar bore receiving the plunger core in threaded engagement, the catch surface fixed to the plunger collar and the return device engagement surface fixed to the plunger core, the plunger core rotatable relative to the plunger collar for adjusting the axial location of the engagement surface advanced position relative to the housing over the axial adjustment length.

11. A clamp assembly for an injection molding machine, the clamp assembly comprising:

a) a clamp cylinder housing having an inner end and an outer end spaced axially apart from the inner end;

b) a clamp piston comprising a piston head affixed to an end portion of a tie bar, the clamp piston slidable within the housing;

c) a clamp chamber axially intermediate the piston head and the inner end of the housing for urging the clamp piston from a meshing position towards the outer end of the housing when pressurized;

d) a return device axially intermediate the piston head and the outer end of the housing, the return device accommodating movement of the clamp piston from the meshing position towards the outer end of the housing when the clamp chamber is pressurized, the return device having a return device engagement surface movable away from the outer end of the housing to an engagement surface advanced position for pushing the clamp piston back to the meshing position when pressure in the clamp chamber is relieved; and e) a mold break chamber within the housing for urging the clamp piston from the meshing position towards the inner end of the housing when pressurized.

12. The clamp assembly of claim 11, wherein the return device engagement surface resiliently bears against the clamp piston when pushing the clamp piston from the outer end of the housing to the meshing position.

13. The clamp assembly of claim 11, wherein the mold break chamber has a volume that remains generally constant when the clamp piston moves from the meshing position toward the outer end of the housing.

14. The clamp assembly of claim 11, wherein the axial location of the engagement surface advanced position is infinitely adjustable relative to the housing over an axial adjustment length for accommodating changes in the axial location of the meshing position in response to changes in mold height.

15. The clamp assembly of claim 14, wherein the return device is coupled to an adjustment actuator, and wherein rotation of the adjustment actuator adjusts the axial location of the engagement surface advanced position relative to the housing over the axial adjustment length.

16. The clamp assembly of claim 14, wherein the mold break chamber is bounded axially by a housing mold break surface fixed relative to the housing and an opposed return device mold break surface of the return device, the housing mold break surface directed towards the inner end of the housing and the return device mold break surface directed toward the outer end of the housing.

17. The clamp assembly of claim 16, wherein the return device comprises a plunger movable within the housing and relative to the clamp piston, the return device mold break surface fixed to the plunger, and wherein the mold break chamber urges the plunger towards the inner end of the housing when pressurized for pushing the clamp piston from the meshing position towards the inner end of the housing.

18. The clamp assembly of claim 17, further comprising a stop surface fixed relative to the clamp piston for engagement by a catch surface fixed relative to the plunger to limit axial travel of the return device engagement surface away from the plunger.

19. The clamp assembly of claim 18, further comprising a return device adjustment surface axially fixable relative to the housing, the plunger abutting the return device adjustment surface during movement of the clamp piston from the meshing position toward the outer end of the housing when the clamp chamber is pressurized, and during movement of the return device engagement surface away from the outer end of the housing to the engagement surface advanced position when pressure in the clamp chamber is relieved.

20. The clamp assembly of claim 19, wherein the axial location of the return device adjustment surface is adjustable relative to the housing for adjusting the axial location of the engagement surface advanced position over the axial adjustment length.

21. The clamp assembly of claim 17, wherein the return device comprises a plurality of springs axially captive between the clamp piston and the plunger, the springs pushing the return device engagement surface against the clamp piston and urging the clamp piston and the plunger axially apart.

22. The clamp assembly of claim 11, further comprising a stop surface within the housing for engagement by a catch surface fixed to the return device, the catch surface engaging the stop surface when the return device engagement surface is in the engagement surface advanced position to inhibit further axial travel of the return device engagement surface away from the outer end of the housing.

23. The clamp assembly of claim 11, wherein the mold break chamber is bounded axially by a tie bar mold break surface of the tie bar and an opposed return device mold break surface of the return device.

24. The clamp assembly of claim 11, wherein the return device and the tie bar inter-engage in sealed sliding fit to enclose the mold break chamber.

25. The clamp assembly of claim 24, wherein the mold break chamber comprises a tie bar cavity in the tie bar and a return device recess in the return device.

26. The clamp assembly of claim 11, further comprising a bore extending axially through the return device, the bore providing a passageway for fluid communication between an exterior of the housing and the mold break chamber.

27. A method of unclamping a mold in an injection molding machine, the method comprising:
  a) relieving pressure in a clamp chamber, the clamp chamber urging a clamp piston affixed to a tie bar towards a clamping position when pressurized; and
  b) pressurizing a mold break chamber to urge the clamp piston into a mold break position, the mold break chamber bounded axially by a tie bar mold break surface of the tie bar and an opposed return device engagement surface of a return device, the return device for urging the clamp piston towards a meshing position when pressure in the clamp chamber is relieved, the meshing position axially intermediate the mold break and the clamping positions.

28. The method of claim 27, wherein during step (b), the clamp piston moves towards the mold break position and a moving platen coupled to the tie bar via a locking assembly moves away from a stationary platen to which the clamp chamber is affixed.

29. A clamp assembly for an injection molding machine, the clamp assembly comprising:
  a) a clamp cylinder housing;
  b) a clamp piston affixed to an end portion of a tie bar and slidable within the housing among a clamping position, a mold break position, and a meshing position disposed axially intermediate the clamping and the mold break positions;
  c) a clamp chamber disposed within the housing for urging the clamp piston towards the clamping position when pressurized;
  d) a return device disposed within the housing for urging the clamp piston towards the meshing position when pressure in the clamp chamber is relieved; and
  e) a mold break chamber bounded axially by a tie bar mold break surface of the tie bar and a return device mold break surface of the return device, the mold break chamber for urging the clamp piston towards the mold break position when pressurized.

30. A method of operating a clamp assembly of an injection molding machine, the method comprising:
  a) relieving pressure in a mold break chamber, the mold break chamber for urging a piston assembly affixed to a tie bar from a meshing position towards an inner end of a clamp housing when pressurized to urge apart mold halves of the injection molding machine;
  b) pressurizing a clamp chamber to urge the piston assembly towards an outer end of the housing; and
  c) relieving pressure in the clamp chamber and moving a return device engagement surface of a return device away from the outer end of the housing and to an engagement surface advanced position, the return device engagement surface pushing the piston assembly to the meshing position during movement to the engagement surface advanced position.

31. The method of claim 30 further comprising repeating steps (a) to (c) during successive machine cycles with a first mold defining a first axial location for the meshing position; and after changing the first mold to a second mold defining a second axial location for the meshing position, adjusting the axial location of the engagement surface advanced position to correspond to the second axial location for the meshing position.

32. The method of claim 31, wherein when the return device engagement surface is in the engagement surface advanced position, a catch surface of the return device abuts a stop surface within the housing to limit further axial movement of the return device engagement surface away from the outer end of the housing.

* * * * *